(12) United States Patent
Amamiya et al.

(10) Patent No.: US 7,975,291 B2
(45) Date of Patent: Jul. 5, 2011

(54) NETWORK NODE MACHINE AND INFORMATION NETWORK SYSTEM

(75) Inventors: Makoto Amamiya, Kasuga (JP);
Satoshi Amamiya, Fukuoka (JP);
Tadashige Iwao, Kawasaki (JP);
Makoto Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 11/949,719

(22) Filed: Dec. 3, 2007

(65) Prior Publication Data

US 2008/0086763 A1    Apr. 10, 2008

Related U.S. Application Data

(62) Division of application No. 10/900,409, filed on Jul. 28, 2004, now abandoned.

(30) Foreign Application Priority Data

Jul. 31, 2003  (JP) ................... 2003-284400

(51) Int. Cl.
*G06F 7/04* (2006.01)
*G06F 15/16* (2006.01)
*G06F 17/30* (2006.01)
*H04L 29/06* (2006.01)
*G06F 21/00* (2006.01)
*G06F 15/173* (2006.01)

(52) U.S. Cl. ............ 726/6; 713/163; 713/182; 709/217; 709/225

(58) Field of Classification Search .................. 713/182; 726/6; 709/225
See application file for complete search history.

(56) References Cited

U.S. PATENT DOCUMENTS

| 5,173,939 | A | * | 12/1992 | Abadi et al. ..................... 707/9 |
| 5,386,559 | A | * | 1/1995 | Eisenberg et al. ............ 707/695 |
| 5,430,870 | A | * | 7/1995 | Stanton et al. ........................ 1/1 |
| 5,504,879 | A | * | 4/1996 | Eisenberg et al. .................... 1/1 |
| 5,559,802 | A | * | 9/1996 | Robinson et al. ............. 370/469 |
| 5,592,661 | A | * | 1/1997 | Eisenberg et al. .................... 1/1 |
| 5,596,718 | A | | 1/1997 | Boebert et al. .................. 726/16 |
| 5,600,832 | A | * | 2/1997 | Eisenberg et al. .................... 1/1 |
| 5,717,755 | A | | 2/1998 | Shanton ....................... 713/166 |
| 5,778,222 | A | * | 7/1998 | Herrick et al. ..................... 707/9 |
| 5,822,435 | A | | 10/1998 | Boebert et al. ............... 713/192 |
| 5,890,166 | A | * | 3/1999 | Eisenberg et al. .................... 1/1 |
| 5,956,715 | A | * | 9/1999 | Glasser et al. ..................... 707/9 |

(Continued)

FOREIGN PATENT DOCUMENTS

EP    0872798    10/1998

(Continued)

OTHER PUBLICATIONS

Notice of Rejection Grounds for corresponding Japanese Application No. 2003-284440 dated Apr. 4, 2006.

(Continued)

*Primary Examiner* — Christian LaForgia
(74) *Attorney, Agent, or Firm* — Staas & Halsey LLP

(57) ABSTRACT

In the global information sharing and distributing service system, the public use of idle resources can be propelled and sufficient security can be guaranteed on the resources for private use. A node machine configuring an information network includes resources located in a private zone available to private use, resources located in a public zone for public service use, and a private resource security management unit for management of the security of the resources located in the private zone.

4 Claims, 21 Drawing Sheets

U.S. PATENT DOCUMENTS

| | | | |
|---|---|---|---|
| 6,023,765 A | 2/2000 | Kuhn | 726/4 |
| 6,029,247 A | 2/2000 | Ferguson | 726/5 |
| 6,061,684 A * | 5/2000 | Glasser et al. | 707/9 |
| 6,389,535 B1 | 5/2002 | Thomlinson et al. | 713/165 |
| 6,643,782 B1 | 11/2003 | Jin et al. | |
| 6,714,930 B1 | 3/2004 | Garrison et al. | 707/9 |
| 6,772,350 B1 * | 8/2004 | Belani et al. | 726/2 |
| 6,898,633 B1 | 5/2005 | Lyndersay et al. | 709/226 |
| 6,907,608 B1 | 6/2005 | Susser et al. | 719/315 |
| 6,910,041 B2 * | 6/2005 | Exton et al. | 707/9 |
| 6,922,835 B1 | 7/2005 | Susser et al. | 719/316 |
| 6,944,777 B1 * | 9/2005 | Belani et al. | 713/150 |
| 6,990,527 B2 | 1/2006 | Spicer et al. | 709/229 |
| 6,993,581 B1 * | 1/2006 | Blumenau et al. | 709/225 |
| 6,993,589 B1 * | 1/2006 | Blumenau et al. | 709/229 |
| 7,031,962 B2 * | 4/2006 | Moses | 707/9 |
| 7,185,192 B1 * | 2/2007 | Kahn | 713/155 |
| 7,272,550 B2 * | 9/2007 | Chen et al. | 703/27 |
| 2002/0019824 A1 * | 2/2002 | Holder et al. | 707/100 |
| 2003/0041198 A1 * | 2/2003 | Exton et al. | 710/200 |
| 2003/0114190 A1 | 6/2003 | Want et al. | |
| 2004/0225893 A1 | 11/2004 | Ng | 713/200 |
| 2004/0267749 A1 | 12/2004 | Bhat et al. | 707/9 |
| 2005/0021978 A1 | 1/2005 | Bhat et al. | 713/182 |

FOREIGN PATENT DOCUMENTS

| | | |
|---|---|---|
| GB | 2244356 | 11/1991 |
| GB | 2248324 | 4/1992 |
| JP | 2002-73506 | 3/2002 |
| JP | 2003-058423 | 2/2003 |
| JP | 2003-122635 | 4/2003 |
| WO | WO 03/013586 | 2/2003 |

OTHER PUBLICATIONS

Great Britain Search Report dated Dec. 2, 2004 for corresponding application No. GB 0416960.

* cited by examiner

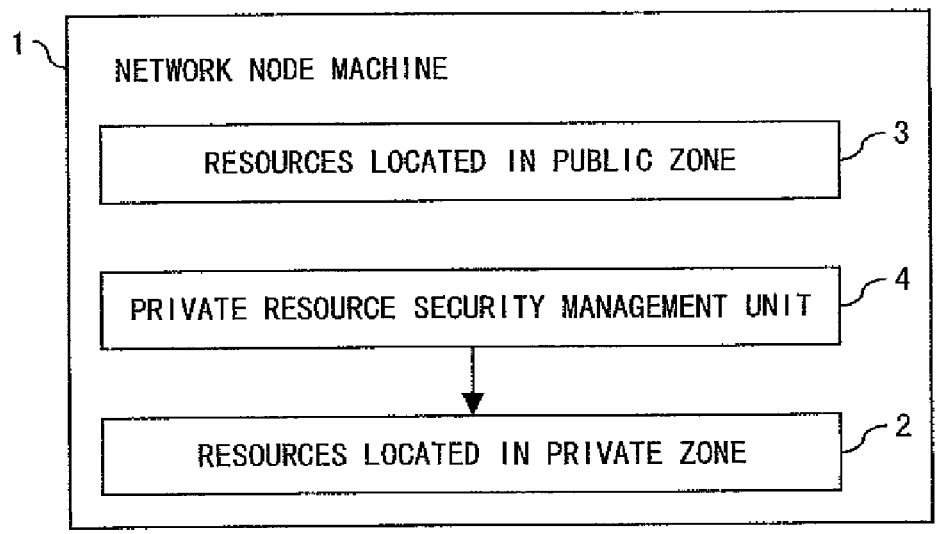
F I G. 1

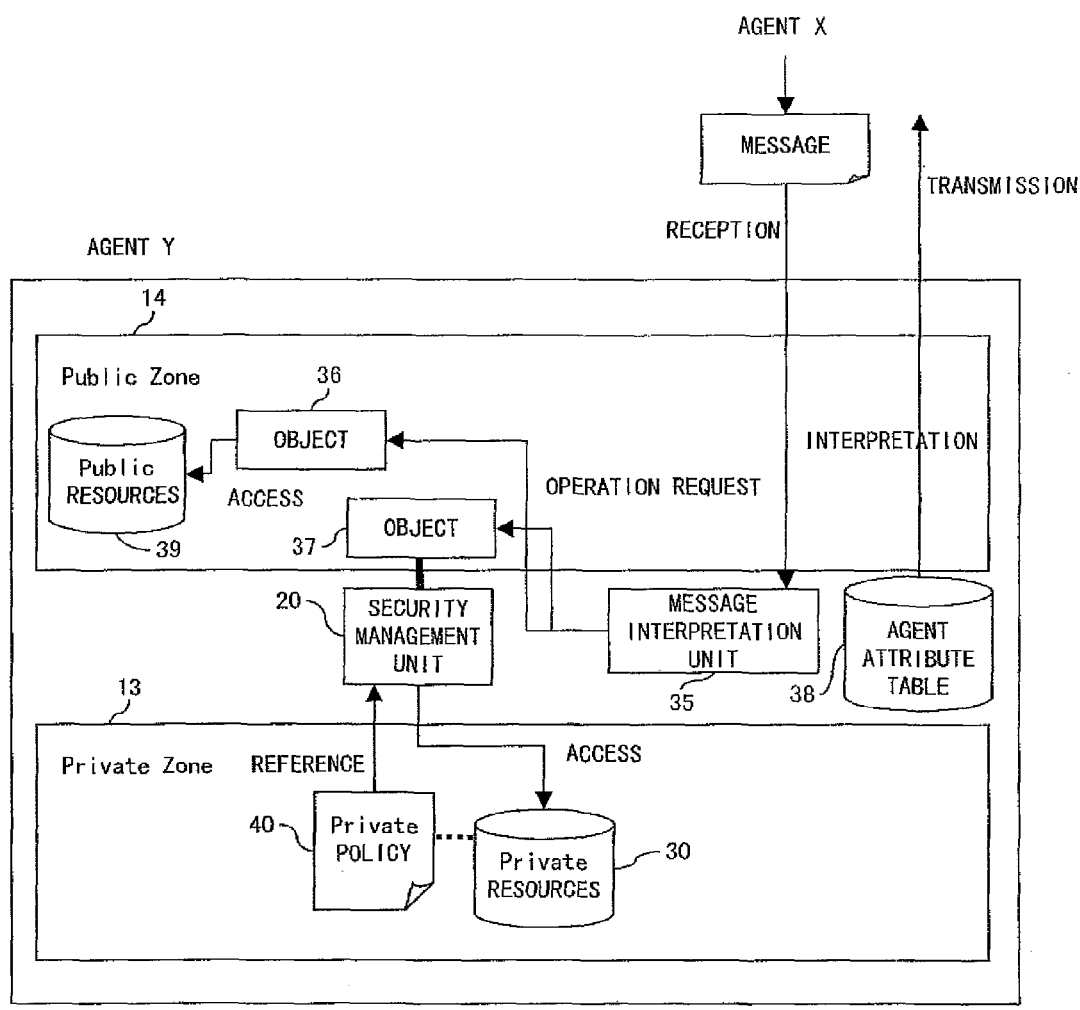
F I G. 14

NETWORK NODE MACHINE AND INFORMATION NETWORK SYSTEM

CROSS-REFERENCE TO RELATED APPLICATIONS

This application is a divisional application of application Ser. No. 10/900,409 filed Jul. 28, 2004, now abandoned, and claims the benefit of Japanese Patent Application No. 2003-284400, filed Jul. 31, 2003, in the Japanese Patent Office, the disclosures of which are incorporated herein by reference.

BACKGROUND OF THE INVENTION

1. Field of the Invention

The present invention relates to a system which manages the resources in an information distribution network and can guarantee the security of the resources and propel the public use of each resource by dividing a zone in which each of the calculation resources and the information resources into a public zone and a private zone, locating the resources to which general access is rejected in the private zone, and locating the resources for public use in the public zone.

It is predicted that various calculation resources and information resources in a global network will be commonly put to public use in a global information sharing and distributing service such as grid computing, ubiquitous computing, etc. with the public taken into account. In the above-mentioned information distributing service environment, the resources management system according to the present invention provides the grounds for a number of global information distribution services, and is used in various application fields.

2. Description of the Related Art

Web information, software resources (music software, video software, etc.), etc. in the Internet have been individually used for each purpose in various Internet business fields. However, the management of access security has not been integrally performed by clearly discriminating the resources between public use resources and private use, but the resources have been used on an ad hoc basis. In the conventional system, there is no concept of a network environment including an integrated security system. Therefore, the security of each information resource has been individually managed, and it has been difficult to guarantee sufficient security to information resources by means of an integral method.

Refer to the following literature for the conventional technology of the security management and access control.

[Literature 1] Japanese Patent Application Laid-open No. 2002-73506

"File Exchange Method"

[Literature 2] Japanese Patent Application Laid-open No. 2003-122635

"Access Right Control System"

The Literature 1 discloses a file exchange method in which a transmitter can confirm correct reception of an electronic data file by a receiver.

The Literature 2 discloses the technology of appropriately processing complicated access right by a server having higher performance in controlling an access right when data is exchanged on a peer-to-peer basis in response to an inquiry about an access right from client equipment as a data provider.

However, there has been the problem with the above-mentioned conventional technology that it is not possible to sufficiently guarantee the security of resources especially for use in private use while discriminating the resources for public use from the resources for private use.

In the communications over the Internet, there are a number of calculation resources and information resources in an idle state without being effectively utilized, thereby generating large waste of resources as a social issue. To effectively use the idle resources for a public use is important in the concept of reducing the waste of resources. Nevertheless, there is no integral technology of utilizing the idle resources.

SUMMARY OF THE INVENTION

The present invention has been developed to solve the above-mentioned problems, and aims at dividing a zone in which calculation resources and information resources are located into a public zone and a private zone, locating in the private zone the resources to which unauthorized access is rejected, thereby guaranteeing the security of the resources in the private zone, and locating in the public zone the resources for public use, thereby propelling the public use of each resource.

The node machine configuring a network according to the present invention includes: resources located in a private zone for private use; resources located in a public zone for use in a public service; and a private resource security management unit such as a security management device as hardware, or a software routine, etc. for managing the security of the resources located in the private zone between the private zone and the public zone.

Also according to the present invention, the network node machine can further include a node security management unit such as an agent operating in the network node machine, etc., operated in the network node machine, for realizing a security barrier capability between the private zone and the public zone using the private resource security management unit.

An information network system according to the present invention includes: resources located in a private zone for private use; resources located in a public zone for use in a public service; and a private resource security management unit for managing security of the resources located in the private zone between the private zone and the public zone, and is configured by node machines connected to each other over a network.

As described above, according to the present invention, a part of computer resources in a node machine can be utilized in a public use while guaranteeing the private resources the security, thereby successfully realizing effective use of computer resources.

BRIEF DESCRIPTION OF THE DRAWINGS

FIG. 1 is a block diagram of the configuration showing the principle of the network node machine according to the present invention;

FIG. 14 is a block diagram of the configuration showing the function of the agent for managing access;

DESCRIPTION OF PREFERRED EMBODIMENTS

Figure 2:
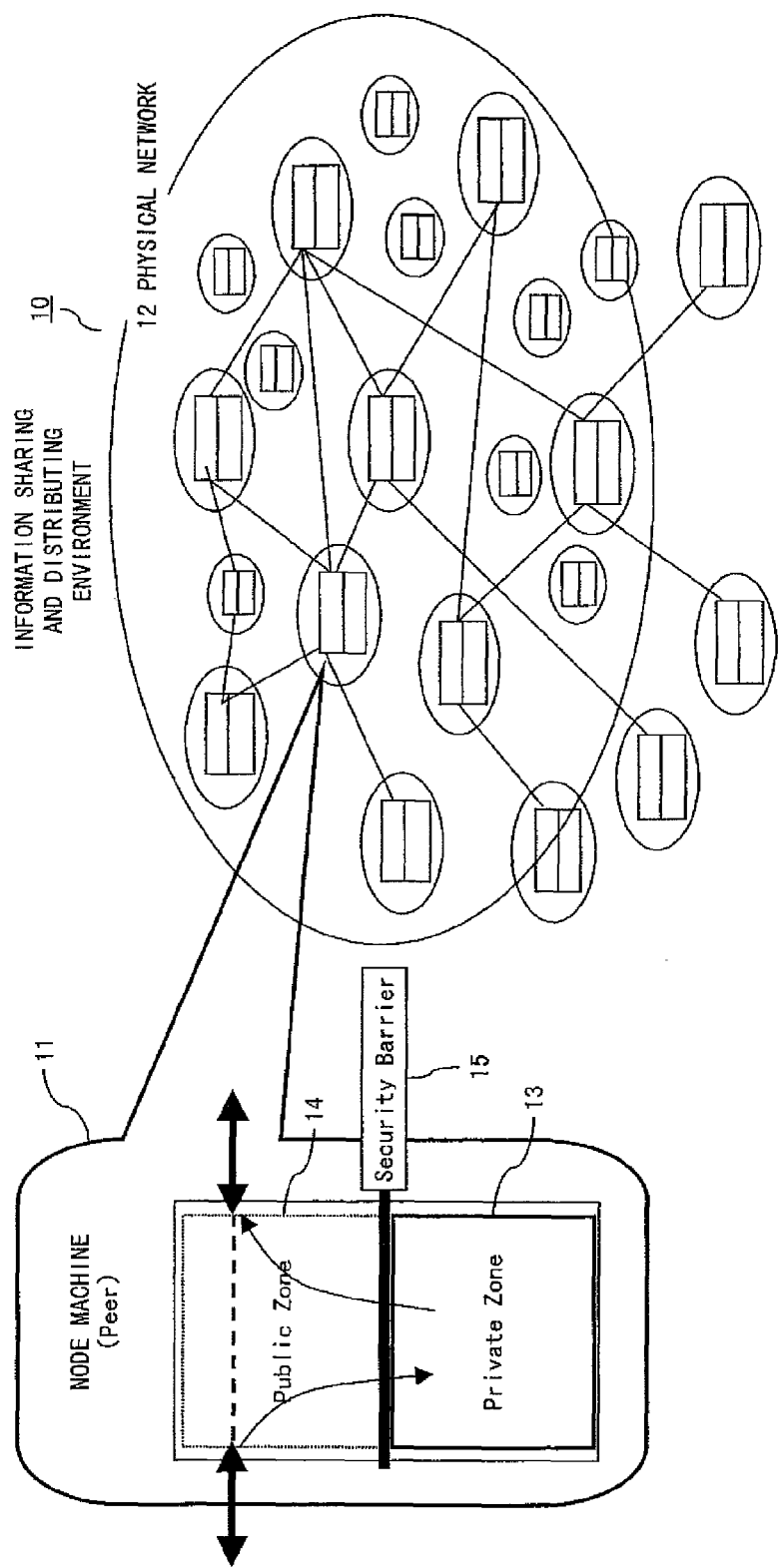
FIG. 2 is an explanatory view of the information sharing and distributing environment.

FIG. 1 is a block diagram of the configuration showing the principle of the network node machine according to the present invention.

In FIG. 1, a network node machine 1 comprises resources 2 located in a private zone for private use; resources 3 located in a public zone for use in a public service; and a private resource security management unit 4 such as a security management device as hardware, or a software routine, etc. for managing the security of the resources 2 located in the private zone between the private zone and the public zone.

The network node machine 1 can also comprise a node security management unit which is, for example, an agent operating in the network node machine and realizes a security barrier capability using the private resource security management unit 4. In this case, a community is formed by a node security management unit operating in the network node machine 1, for example, a plurality of agents, and the community can have a hierarchical structure. Furthermore, in the hierarchical structure, a node security management unit in the network node machine 1 corresponding to each community, for example, a community security management unit having the interface capability with a higher community, for example, a portal agent can be included in the agent.

Furthermore, in the present invention, the community security management unit, for example, a portal agent, can manage the possibility of the subscription of a node security management unit, for example, an agent, to a community. In this case, in response to the attribute of the node security management unit requesting the subscription to a community, the network node machine 1 further comprises an access permission attribute condition storage unit for storing the attribute condition for an access permission determination to a public policy describing the condition including the resources to be provided for a public service after the subscription, and a community security management unit, for example, a portal agent can use the stored contents to manage the possibility of the subscription to a community.

In the present invention, the node security management unit, for example, a portal agent can manage the accessibility to the resources 2 located in the private zone in the network node machine 1 corresponding to the community from the node security management unit, for example an agent of another community. In this case, in response to the attribute of the node security management unit of another community requesting access to the resources 2 located in the private zone of the community, the network node machine 1 in which the community security management unit is operating further comprises an access permission attribute condition storage unit for storing an attribute condition for an access permission determination, and the community security management unit can use the stored contents to manage the accessibility.

In the present invention, the network node machine 1 in which the community security management unit, for example, a portal agent operates further comprises a community management data storage unit, for example a community management table for storing the information about a higher community and a lower community, and a logical address corresponding to the communications path in which the security is confirmed in the hierarchical structure of the community, and the community security management unit can manage the security of the community using the stored contents.

The information network system according to the present invention comprises: resources located in a private zone for private use; resources located in a public zone for use in a public service; and a private resource security management unit for managing security of the resources located in the private zone between the private zone and the public zone, and is configured by node machines connected to each other over a network.

According to the present invention, the security of the resources in the private zone can be guaranteed, and an information distribution environment in which idle resources can be provided for a public use can be constructed, and an information distributing environment such as grid computing, ubiquitous computing in which a larger scale computing and a global information processing service is performed by effectively using various calculation resources and information resources can be constructed.

Furthermore, the present invention is based on the multi-agent system, a lower community of an agent is considered to be a resource, the access management to a community and the access management to a hardware resources/software resources can be integrally processed in the same security management system, thereby briefly and economically realizing the security management device/software.

Before explaining in detail the embodiments of the present invention, the features of the present invention are described below.

In the peer-to-peer (P2P) communications environment in which information is directly exchanged between users using various computer systems and information terminals connected to the Internet, an information communications service is equally supplied to various users including the terminal users. To realize the service, the network includes a number of relay nodes among which messages are relayed and transferred under control. The relay nodes can be server machines or routing machines of a communications carrier, each individual enterprise or company, etc. These machines are located but invisible to users in the network with the addresses searched and transferred, routing controlled, messages converted, transferred, relayed, etc. under communications control. The information terminal of the user has the services of searching and transferring an address, relaying and transferring a message, etc. as high-order service capabilities as a network node machine. In considering the security of the P2P network, the capabilities and the configuration of a physical network layer are to be clearly defined. In the following explanation, the network node machine is referred to as a node machine for short.

On the other hand, for a network user, it is necessary to freely configure a user group of each hierarchical level in a network without considering the structure of a physical network, and to perform P2P communications among different user groups. In the present invention, each user group is referred to as a community, and a network formed among hierarchical communities is referred to as a logical network.

When a user forms a community, and performs the P2P communications, there is the problem of a guarantee of security in the communications among the communities. To guarantee the security of the P2P network, it is necessary as in the physical network to clarify the function and configuration of the logical network, the relationship between the physical network and the logical network, and the interface.

The present invention is to present the architecture of an information network for configuring each community as a logical network which is guaranteed the security without consideration of a physical network, and to present the system of security management based on the architecture.

That is, according to the present invention, a network node machine provided for each node of a physical network has the architecture having a public zone and a private zone to set a flexible logical network and simultaneously guarantee security.

According to the architecture of the present invention, a security barrier is provided between the public zone and the private zone to guarantee security (the security barrier is described later in detail).

In the present invention, the concept of two zones, that is, the public zone and the private zone, is embodied as a community management capability in the logical network layer, and as a capability of an inter-P2P-agent communication control zone (ACC) in the physical network layer.

An agent refers to software for processing a request from another agent or machine (using a message, etc.) independently of and in parallel with the requesting agent or machine.

The above-mentioned node machine refers to a hardware environment (a processor device such as an information terminal, a personal computer, a server machine, etc.). An agent is implemented by software, and operates using a node machine. In a node machine, a plurality of agents operate. The system of performing security management, that is, the implementation of the public capability, the private capability, and the security barrier capability is performed by an agent. The management of the public resources, the management of the private resources, and the security barrier capability (security management unit) are realized as the capability of an agent. An inter-agent communication control zone is implemented by software as an interface unit between an existing physical network communications management unit and an agent.

In a hierarchical logical network, a community in a hierarchical layer is processed as an agent from a higher community. Each resource is also processed as an agent. Therefore, the security management is integrally performed as security management of an agent in a multiagent system having a hierarchical structure for all communities and resources (From a higher layer, an agent is equivalent to a resource. In the explanation below, the word "agent" or "resource" is used depending on the context, but an agent equals a resource).

The architecture is based on the following concept. As described first, in the P2P communications environment, there are a number of node machines in a physical network, and they form information common distribution space. Each node machine controls a path and communications, converts, transfers, and performs a caching operation (temporary storage) on various information such as messages, address information, etc. In the process of a node machine, not only the private process aiming at a private gain of a user of the node, but also a number of processes of a public service for an information distribution are contained. Therefore, in the information common distribution network environments, each node machine is requested to provide not only a private purpose process but also a public service process to be presented. To attain this, a public zone and a private zone are set in advance in a node machine so that a public service capability is presented for the information common distribution in a public zone. A public zone is used in providing public space in advance by contract or as tax as the responsibility or investment for receiving an information network service.

FIG. 2 is an explanatory view of the information sharing and distributing environment according to the present invention. In FIG. 2, an environment 10 comprises a physical network 12 in which node machines 11 are connected with each other. In the node machine 11, a private zone 13 and a public zone 14 are set with a security barrier 15 between them.

Each node of the information network forming the information sharing and distributing environment over the Internet, etc. is provided with a node computer for relaying and transferring a message and data. The messages and data transmitted over a network contain secret information to be presented only to the destinations, and the security management is required not to reveal the information to others or falsify it without permission.

A node machine contains information closed in the node (data and processes closed in the machine and not accessed from external), (for example, when the node machine manages a personal terminal or a database, etc.), and the information has to be managed as private resources.

On the other hand, in the network node, it is necessary for each node computer to have the function of transfer-controlling (relaying) a message and data, and it is a public capability. A node machine has resources for a public service (for example, a Web home page, etc.), and this can be provided as public property. In this case, the accessing (reading) operation to the resources can be a public service.

Otherwise, in the blackboard service such as the chattering, etc., memory space and a reading and writing operation are public services.

The concept of the principle of the present invention resides in that each node machine has two-layer functional structure of public functions and private function, a security barrier is provided between the public functions and the private functions, and an access condition is checked on the access to private resources.

An important point of the present invention is to provide a framework of performing security management with two-layer structure of a public zone and a private zone in each node machine in a network, detailed examples of public functions and private functions, and a method of configuring a security barrier.

In the descriptions above, a node machine refers to a hardware environment (or device). The framework for security management, that is, public functions, private functions, and a security barrier function, are implemented by software agents. An agent is implemented by software, and operates in a node machine. On one node machine, a plurality of agents operate. The management of public resources, the management of private resources, and the security barrier function (security management unit) is realized as the function of an agent.

When the above-mentioned architecture is assumed, an important problem is to guarantee security. Security is based on the existing technology such as encryption technology, authentication technology, etc. A security barrier is provided between a public zone and a private zone for protection against the invasion upon a private zone. On the other hand, a public zone is a public area through which various data and messages (including temporary data and messages) can pass. A community management system is also defined as a private zone of a portal agent described later, and only what has passed a security check can access the community.

A security barrier is provided in a portal agent as described in the second embodiment. Practically, a security management device or a software routine is provided in a node machine having a portal agent function so that the security management unit in each portal agent can manage the security using the device or the routine.

Figure 3:
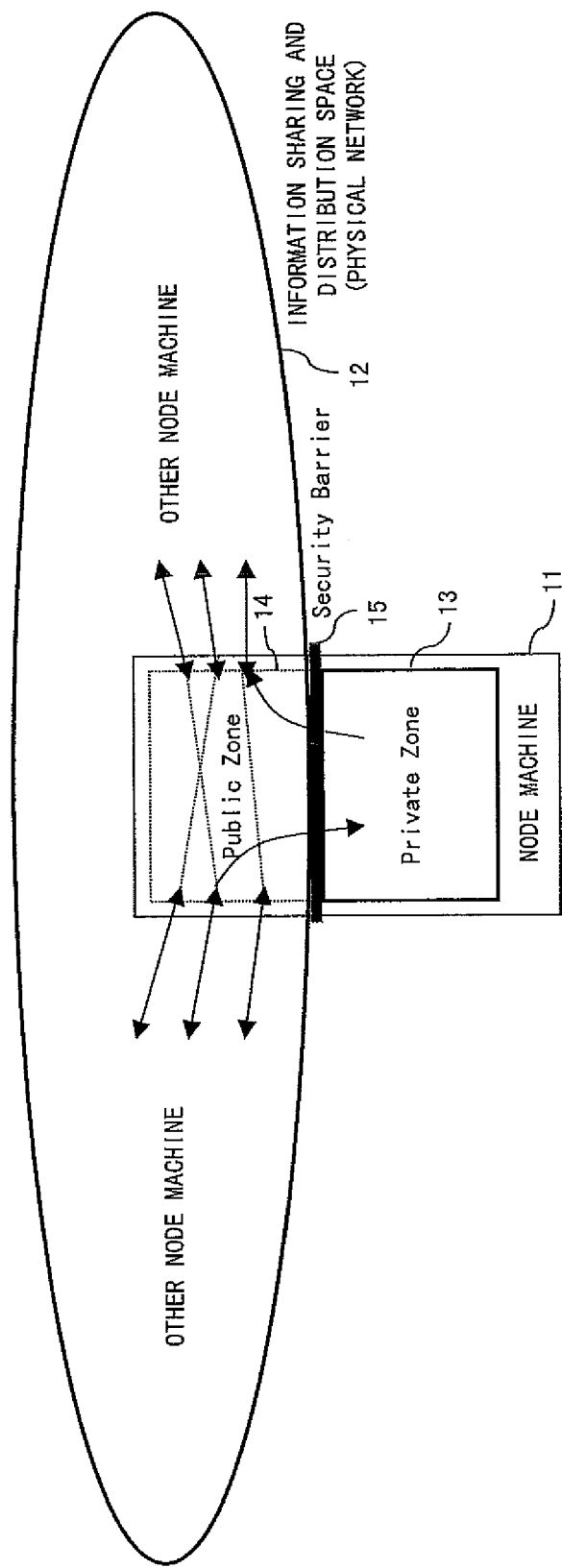
FIG. 3 is an explanatory view of a public zone and a private zone.

FIG. 3 is an explanatory view of a public zone and a private zone.

The node machine 11 in the physical network 12 comprises the private zone 13 and the public zone 14. The private zone and the public zone are respectively set in a logical network management unit (community management agent) and in a physical network management unit (ACC).

A public zone is an open area, and offers a public application service as described below.
  Address search of other service sites (node machine)
  Address caching
  Routing
  Transferring a message
  Distributing a message
  Caching related information
  Others In a private zone, the following application service specific to an owner of each node machine can be offered.
  Guarantee of security of inter-community communications (management of communications in community space)
    Security management of community
    Secure communications among communities
    Protection of access to community
    Service application to user in community The access from a public zone to a private zone is protected by a security barrier.

A public zone and a private zone exist in both a logical network management unit and a physical network management unit in a community management system, and are managed respectively for a public service process and a private purpose in the logical network and the physical network. Practically, the public zone management in the logical network is performed by the community management unit, and the public zone management in the physical network is performed in the inter-agent communication control zone.

As described above, the general explanation of the feature of the present invention has been given. The configuration and the practical operation of the logical network and the physical network according to the embodiments of the present invention are described below.

[Structure and Management of Community]

Figure 4:
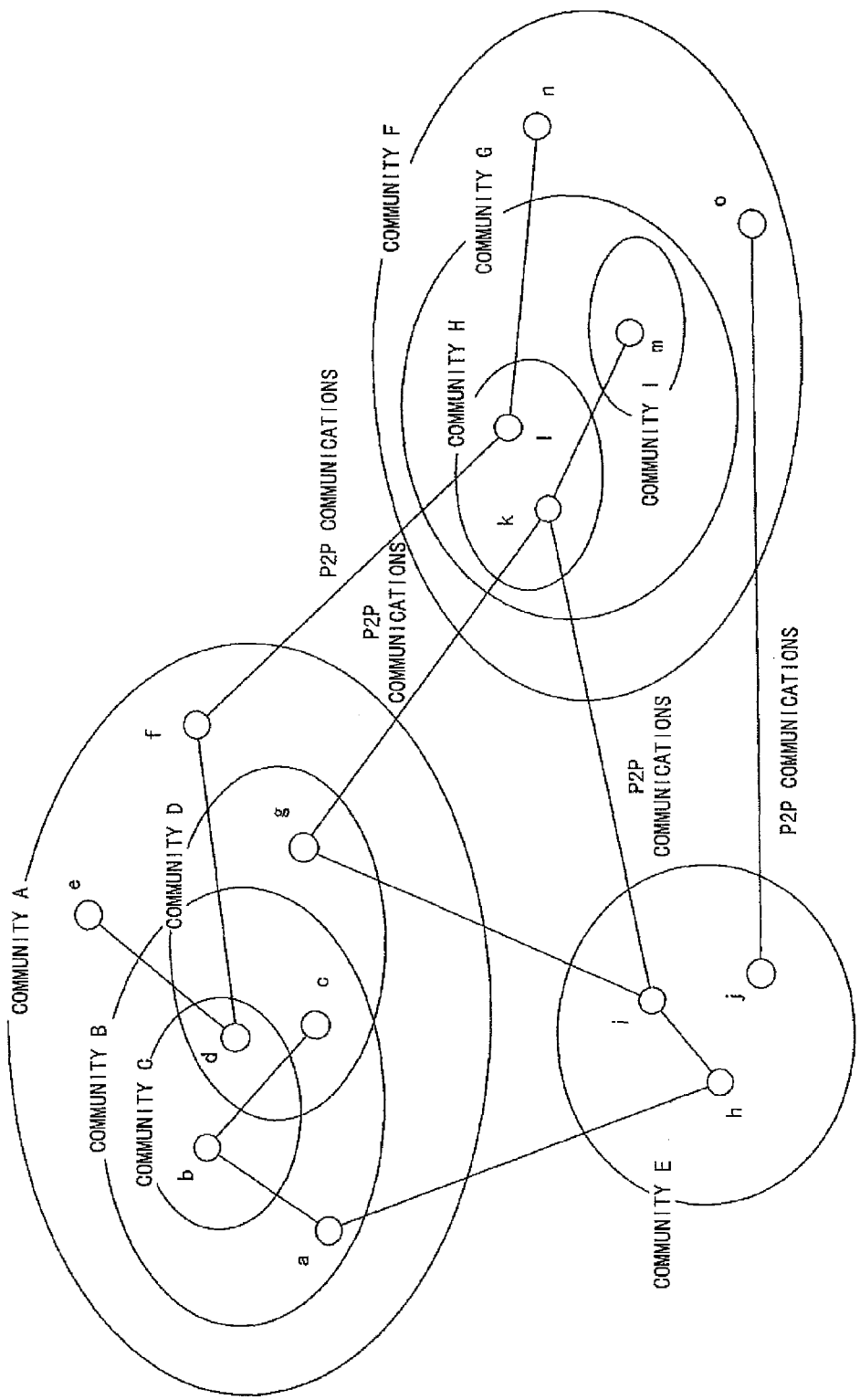
FIG. 4 is an explanatory view of the peer-to-peer communications between different communities.

In the present invention, an architecture in which each user and a community to which a user belongs to (various communities such as an enterprise, a private group, etc.) can be flexibly configured as a logical network is assumed. A community has a hierarchical structure as shown in FIG. 4. Each user belongs to any community. The structure of a community corresponds to the structure of an organization of an enterprise and a group in a society. Since a community is formed depending on the purpose of various activities, each person can belong to a plurality of communities depending on the purposes of the activities.

As described above, a community has a hierarchical structure (as the structure of an organization in a human society). Each community has an agent, and each agent forms part of a lower community (also referred to as a child community) in the community. In the example shown in FIG. 4, there are communities A, E, and F at the top level. Communities B and D are in the community A, and a community C is in the community B. In the community A, the communities B and D play roles of agents B and D. "a" through "o" indicate the lowest agents (that is, the primitive agents having no lower communities below them). For example, a user terminal, etc. can be considered to be a primitive agent.

A community is not exclusive, and can have a plurality of overlapping portions (shares one or more agents). In this case, an agent belonging to a plurality of communities has a different role and behavior in each community. In FIG. 4, for example, agents c and d respectively belong to the communities B and D and communities C and D. However, a community cannot have an equivalent or higher community as a lower community (this structure is a DAG (directed acyclic graph) structure).

P2P communications refer to the communications between agents. FIG. 4 shows communications between the primitive agents. (For example, it corresponds to the communications between user terminals.) In FIG. 4, the agents performing P2P communications are connected by a line (for example, between a and b, a and h, j and o, etc.).

In the present invention, a person and a community are all processed as agents. Each of a person and a community has an attribute, and the attribute is managed as a process performed by a community management function of an agent.

Figure 5:
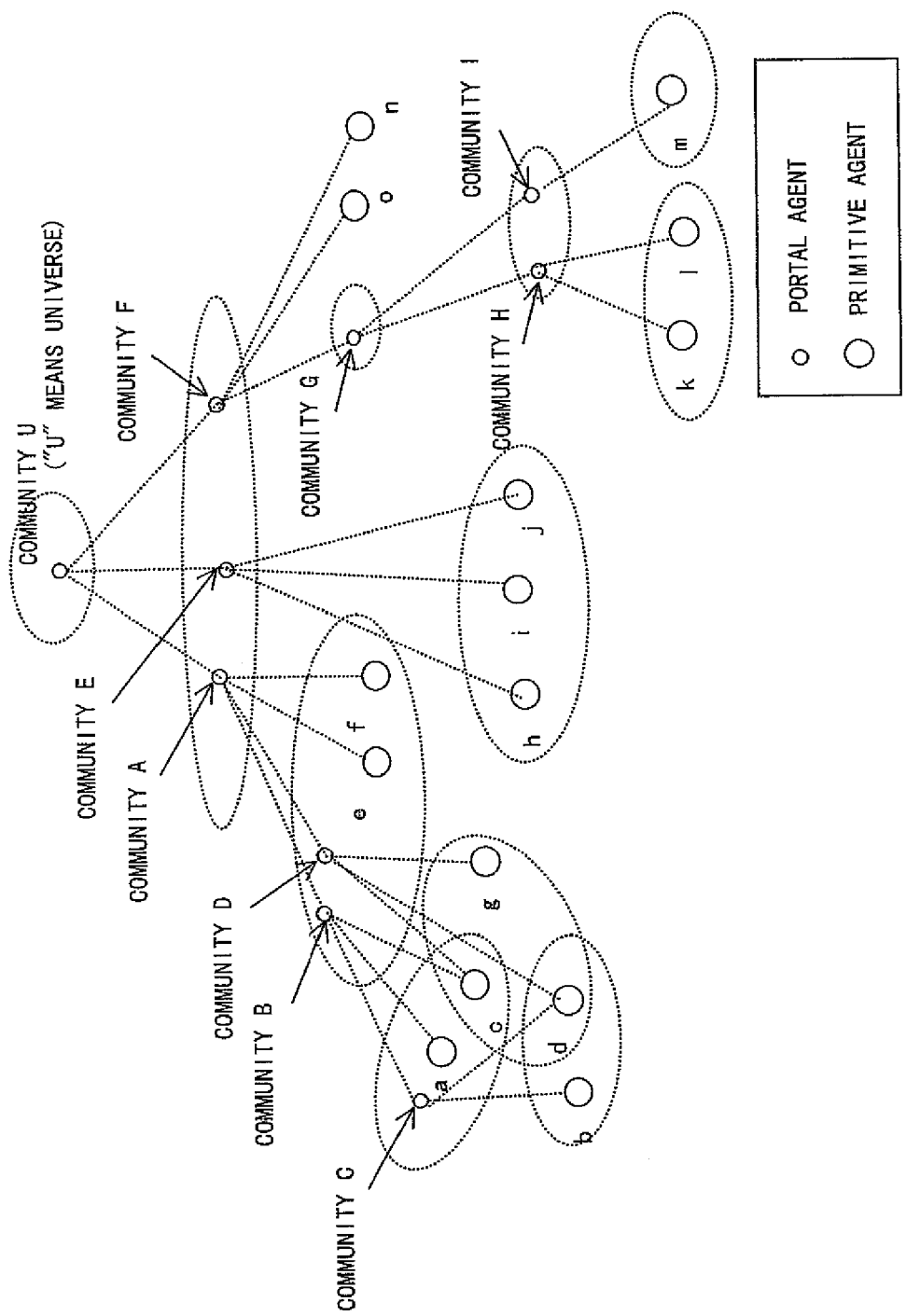
FIG. 5 is an explanatory view of the hierarchical structure of a community.

When the community structure is configured as a logical network, the network topology as shown in FIG. 5 is realized. Each community is managed as a private resource (of a portal agent, which manages a lower community as a resource).

In FIG. 5, a community U corresponds to an entire space, and is a unique existence. All communities are configured under the community U. Therefore, the community U is referred to as a universe community.

With the above-mentioned schematic diagram, each agent is assigned a name reflecting its own hierarchical structure so that each community and primitive agent can be uniquely identified. For example, the circle indicated by the arrow and "a" of the community C, and the ellipse by dotted line encompassing "c" represent the community B.

The name of an agent is given by tracing the lower community based on the community U. This is referred to as the absolute naming of an agent. The absolute naming indicates the path (downward path) from the universal community to the agent. The absolute naming of the primitive agent c is A.B.c or A.D.c. When the agent c behaves in the community B, it has the name A.B.c. When it behaves in the community D, it has the name A.D.c.

On the other hand, each agent can have a relative name (be identified by a relative name). A relative name reflects the access path structure from the referencing side. For example, when the agent c is referred to by the agent e, the name is A.B.c or A.D.c. (Note that, also in this case, two names can be assigned depending on the behavior of the c). The naming indicates the path from the agent e to the agent c. When the agent a is identified by the agent h, the name is E!A.B.a. In this case, the path structure starts with the community E (no other than the agent E in the community U) having the agent h as an element (upward path), passes to the agent A (bridging) (the symbol ! indicates the transfer to another agent in the same community) in the community U, transfers to the A.B.a and the lower community (downward path), and finally to the agent a.

The relative naming is bidirectional. That is, for example, h can be identified by the name B.A!E.h when viewed from a. On the other hand, it can be identified by the name E!A.B.a when viewed from h.

Figure 6:
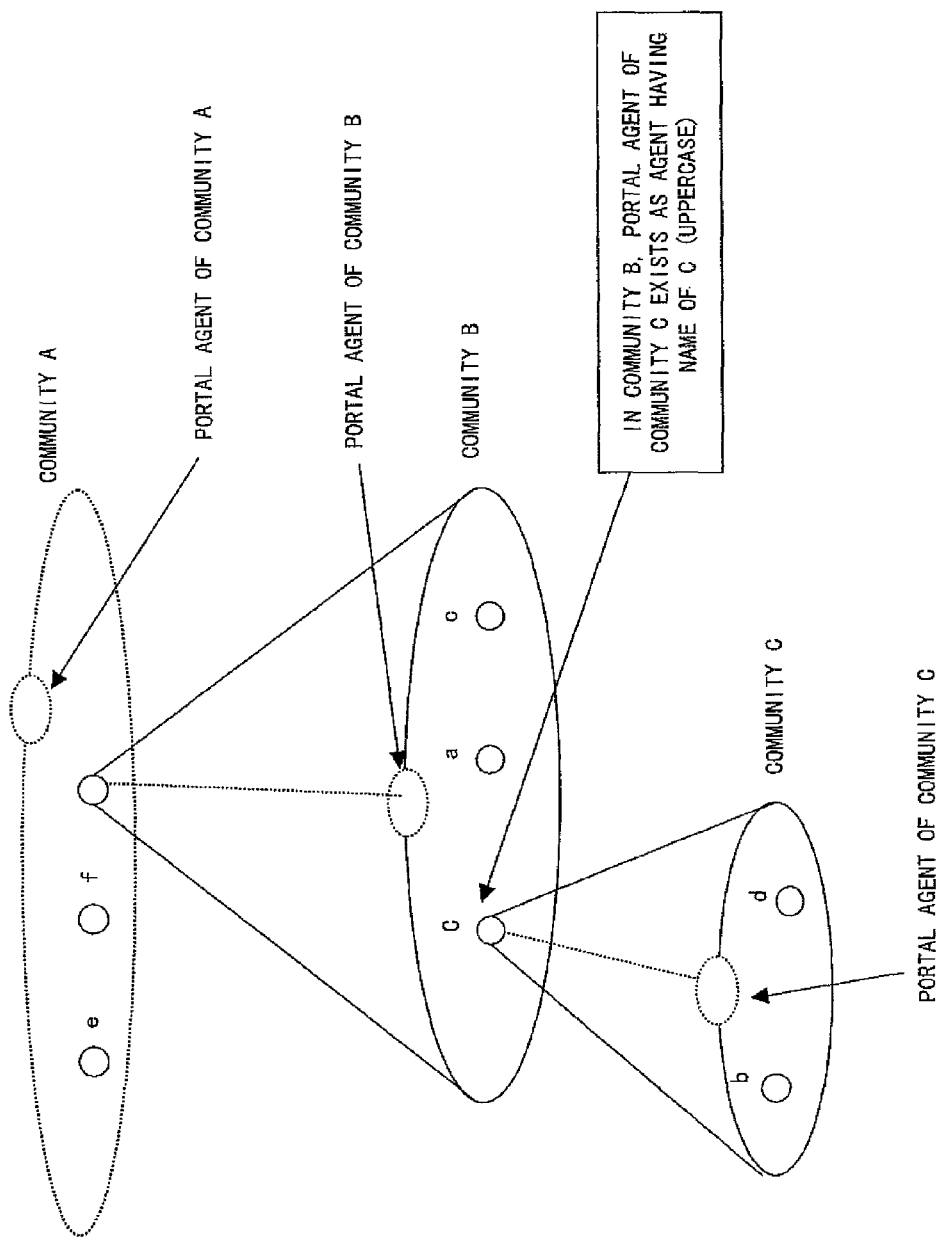
FIG. 6 is an explanatory view of the relationship between a community and a portal agent.

FIG. 6 is an explanatory view of the relationship between the community and the portal agent. In FIG. 6, for example, the portal agent of the lowest community C can be an agent C in the higher community B.

Figure 7:
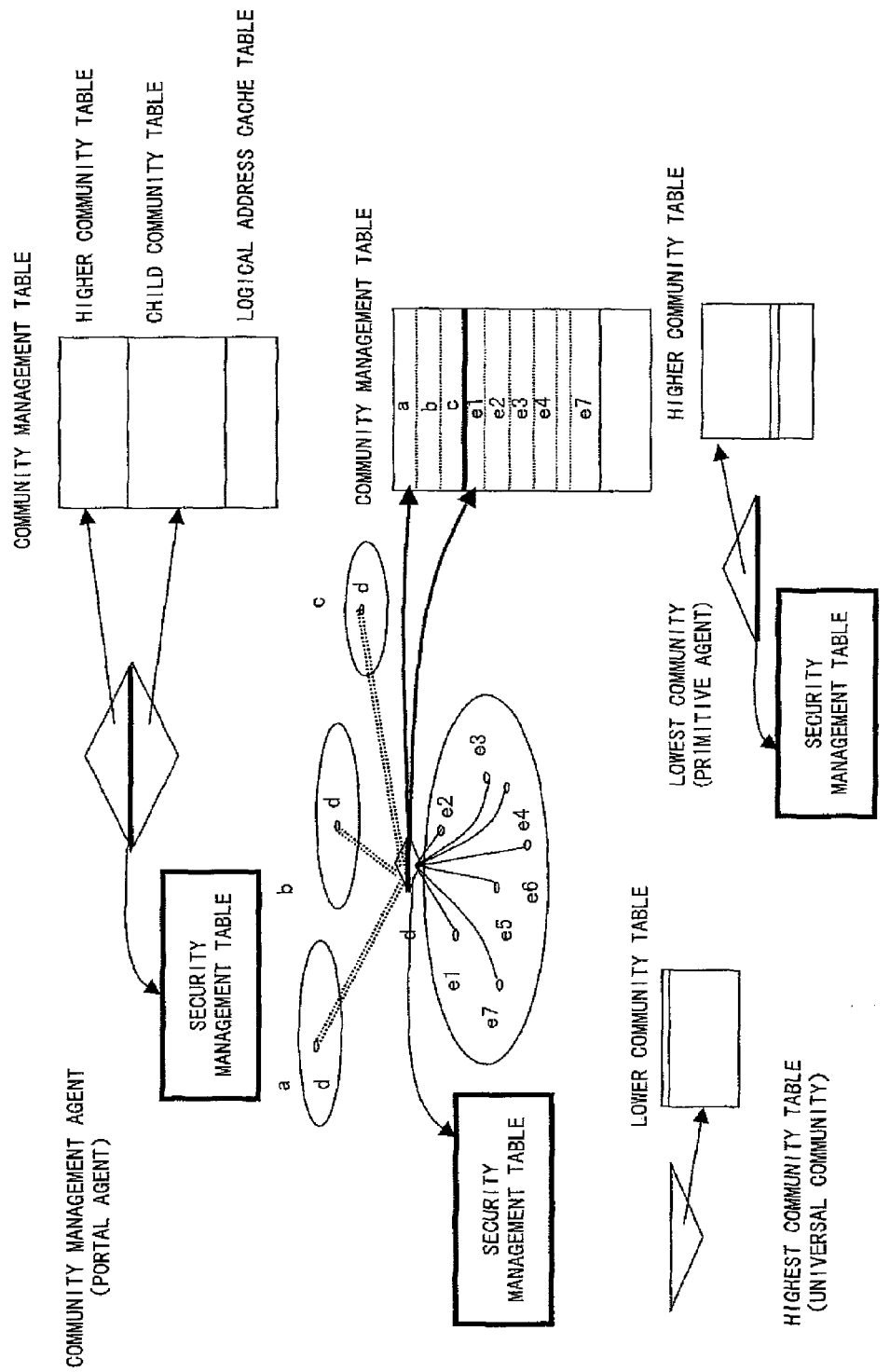
FIG. 7 is an explanatory view of the management of a community by a portal agent.

Each community has a community management table showing the higher communities and the lower communities, and manages the hierarchical topology of communities as shown in FIG. 7. A community behaves as an agent when viewed from a higher layer. Each community has one portal agent (community management agent),and has an interface capability with a higher community. A lower community is processed as a resource for a portal agent, and managed by a portal agent. A security management function is an important function in the interface functions of a portal agent.

An entry of the community management table stores the logical name of a higher community, the logical name of (the agent of) a lower community, and its attribute information. The attribute information includes a security management table of the community (the attribute of the agent, and the access permission attribute condition table to the agent), and a security check is made using the contents of the table when a P2P communications path is set between the communities (and the terminal users belonging to the communities).

The management of a community is performed by a portal agent. A portal agent controls a communications path when a community is managed and a message and data are relayed and transferred using the community management table. The community management table comprises a higher community table and a lower community table. The higher community table records a higher community (the name of a portal agent of a higher community), and the lower community table records a lower community (the name of a portal agent of a lower community). A communications path once established in the peer-to-peer communications (the logical network address of the partner peer agent) is recorded in a cache table. In the second and subsequent communications, the communications are performed directly using a cached logical address.

A portal agent processes a lower community as a resource and performs security management. A portal agent has a security management table and performs a security check on access to a community. The security barrier refers to this capability or function. When P2P communications are permitted by a security check, a communications path is set in a logical network. If the path is set, the P2P communications can be performed between the corresponding users.

A portal agent has a lower community table, a logical address cache table, and a public policy described later as private resources, and has at least a higher community table as public resources, and the function of managing subscription and withdrawal to and from the community of another agent as a special capability. On the other hand, a primitive agent has no capability of managing the subscription or withdrawal, and has a lower community table which is constantly empty. A community is not located independent of a portal agent or a (primitive) agent, but is formed by a logical network formed of a portal agent and an arbitrary number of (primitive) agents.

Figure 8:
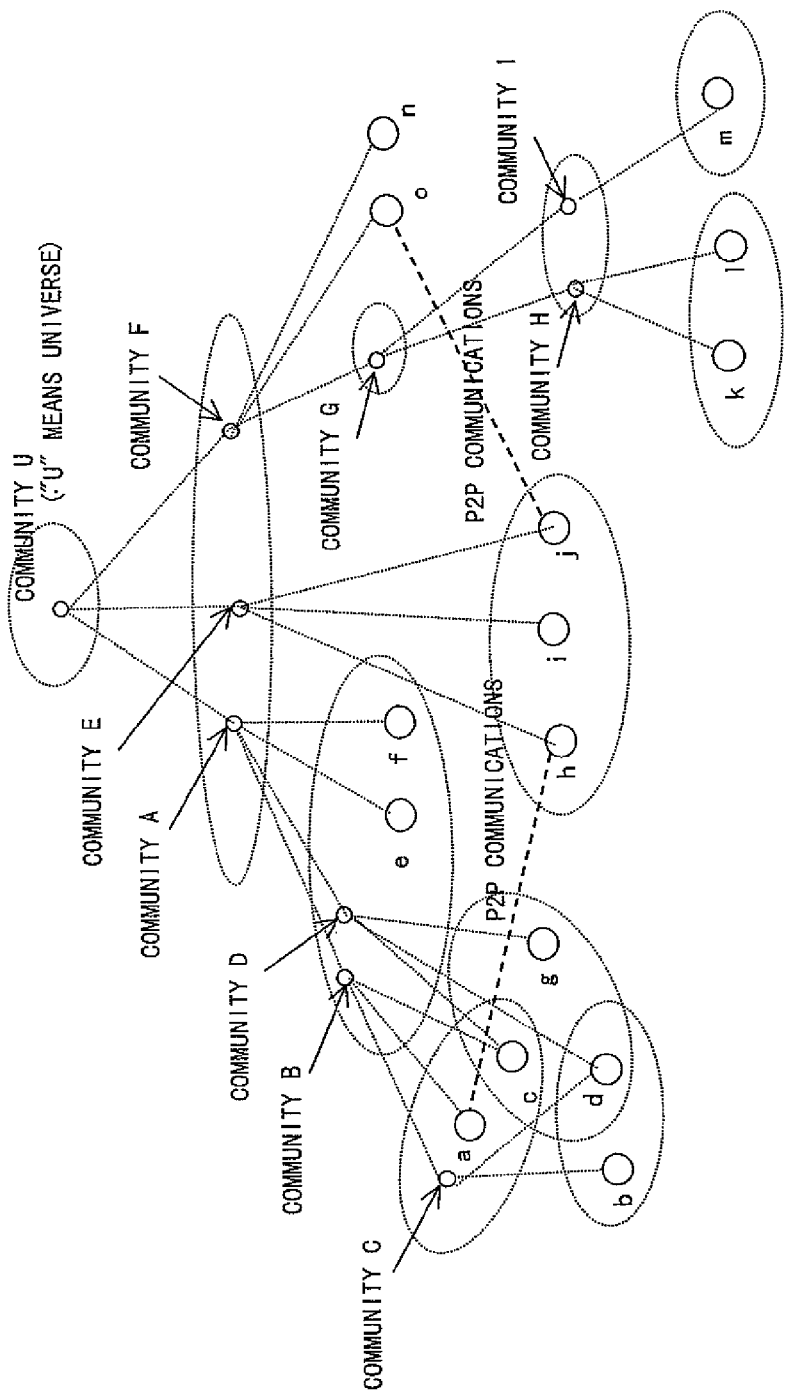
FIG. 8 is an explanatory view of the hierarchical structure of a community and managing a peer-to-peer communications path.

FIG. 8 shows the state of the P2P communications path management and its short circuit path management. There occurs a problem of overhead of community management each time a security check is performed upon request for the P2P communications. To reduce the overhead, a short circuit path for bypassing the communications path is generated when communications between communities for which security communications are guaranteed as a result of the past security check, and the path is cached in the logical address cache table in the agent management table.

Once the peer-to-peer communications are performed, a bypass is generated between the agents performing the peer-to-peer communications to efficiently perform the peer-to-peer communications. The bypass information is recorded in the cache table in the community management table of the source agent shown in FIG. 7, and is used in controlling the direct peer-to-peer communications. For example, when a user a and a user h perform the P2P communications, a security check is performed along the inter-community communications path a.B.A.U.E.h in the first communication, and a communications path is set in the physical network between a and h when control is passed to the security check.

For example, assume that peer-to-peer communications are performed between the agent a and the agent h. If a communications path is established after the security check is made between the community B and the community E, the security is guaranteed. Therefore, when the P2P communications are frequently performed, a logical bypass is established between B and E. Hereafter, the communications between an agent belonging to the community B (having the same security attribute as the agent a) and an agent belonging to the community E (having the same security attribute as the agent h) are performed through the logical bypass. The interface management between the communications path in the logical network and the communications path in the physical network is explained by referring to FIG. 9.

Figure 9:
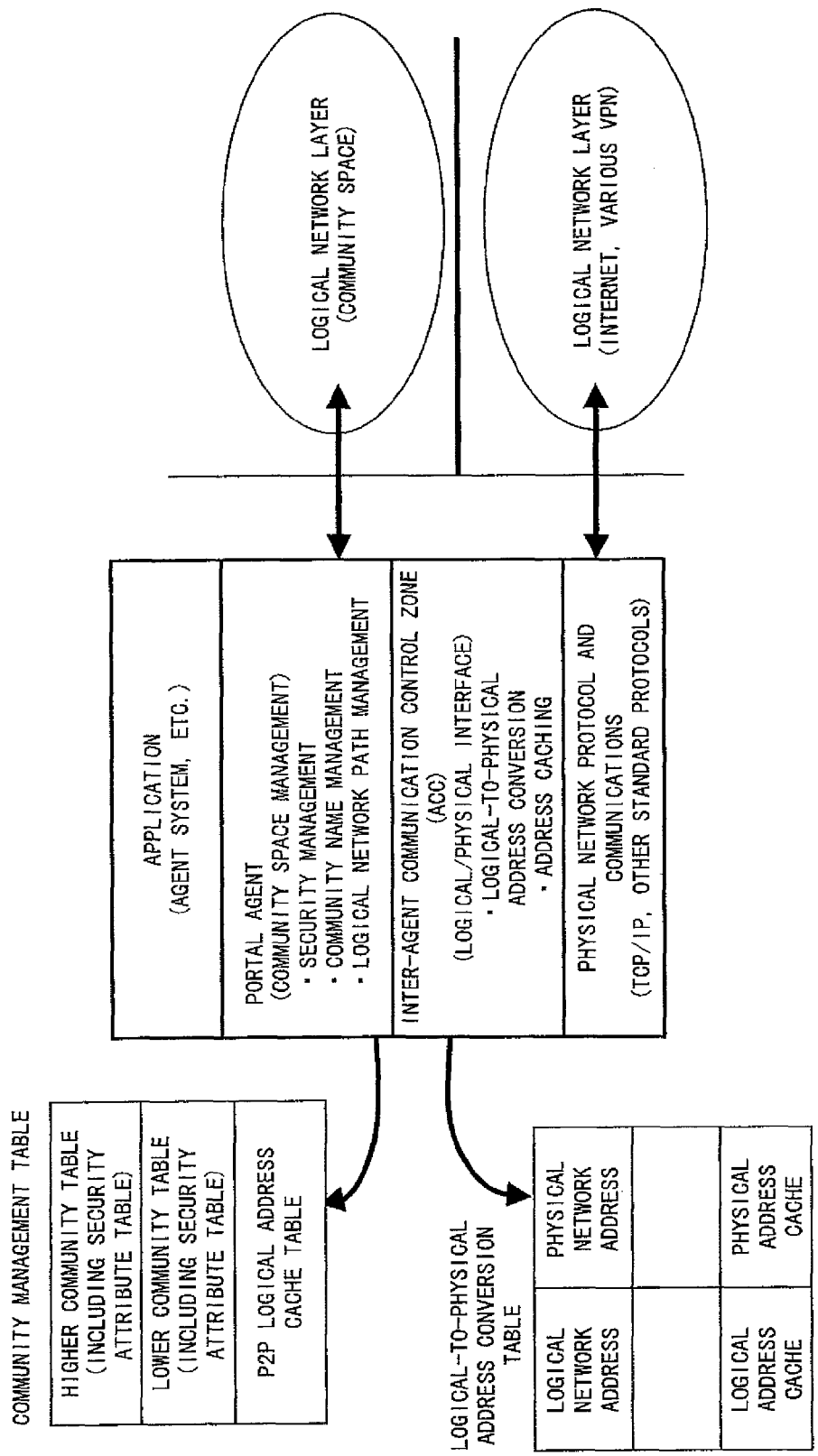
FIG. 9 is an explanatory view of an interface between the logical network and the physical network.

FIG. 9 is an explanatory view of an interface between a logical network and a physical network.

The community management shown in FIGS. 5 through 8 relates to the concept of logical network space, and it is inefficient and impractical to perform communications based on the above-mentioned naming rules and the trace of a path. Therefore, each portal agent is assigned the interfacing function between the logical network and the physical network. Since the primitive agent has a network function equivalent to a portal agent, the primitive agent also has the logical and physical interface function. Hereinafter an agent refers to both portal agent and primitive agent of a community.

The community management table of a portal agent is used as a management table of logical network space. On the other hand, the inter-agent communication control zone provided in each agent performs logical-to-physical address conversion using a logical-to-physical address conversion table. The logical-to-physical address conversion table is a correspondence table between a logical address and a physical address, and has a cache table unit for caching a physical address. A cache address records the correspondence between the logical address cache table and the physical address cache table, and a logical address can be converted into a physical address based on the correspondence.

[Interface between Logical Network and Physical Network]

The logical network is a virtual network forming a community topology. A P2P communications application is described in the logical network space without consideration of the structure of the physical network.

To reserve the flexibility of a logical network and efficiently perform the P2P communications, a physical network protocol such as a TCP/IP, etc. is used when the P2P communications are actually performed. FIG. 2 presented above also shows the concept of the configuration of an interface between a logical network and a physical network.

The interface management between a logical network layer and a physical network layer and logical-to-physical address conversion are performed by the inter-agent communication control zone (ACC).

When the P2P communications are set in a logical network, the address in the physical network of the user (community) of the P2P communications is determined. Therefore, when communications are practically performed, the address in the logical network is converted into the address in the physical network by the ACC, and the communications are performed using the routing management system for business use using the physical network protocol such as an Internet protocol.

The configuration of the public zone and the private zone, and the practical operations are explained below as the second embodiment. To set a flexible logical network and simultaneously reserve the security, a node machine set in each node of the physical network is assigned the architecture having public service space (public zone) and private space (private zone) (the security is based on the existing technology such as the encryption technology, the authentication technology, etc.).

In FIG. 2 showing the concept of the architecture having a public zone and a private zone, the security barrier 15 is provided between the public zone 14 and the private zone 13 for protection against the invasion upon the private zone 13. The security barrier 15 is practically configured by a security management device or a security management routine, and is set in all node machines 11.

The public zone is located as a public area, and allows various data and messages to pass through it (including temporary storage). The community management system is located as a private zone of a portal agent, and allows what has passed a security check to access the community.

A public zone and a private zone exist in both a logical network management unit and a physical network management unit in a community management system, and are managed respectively for a public service process and a private purpose in the logical network and the physical network. Practically, the public zone management in the logical network is performed by the community management unit, and the public zone management in the physical network is performed in the inter-agent communication control zone (ACC).

Figure 10:
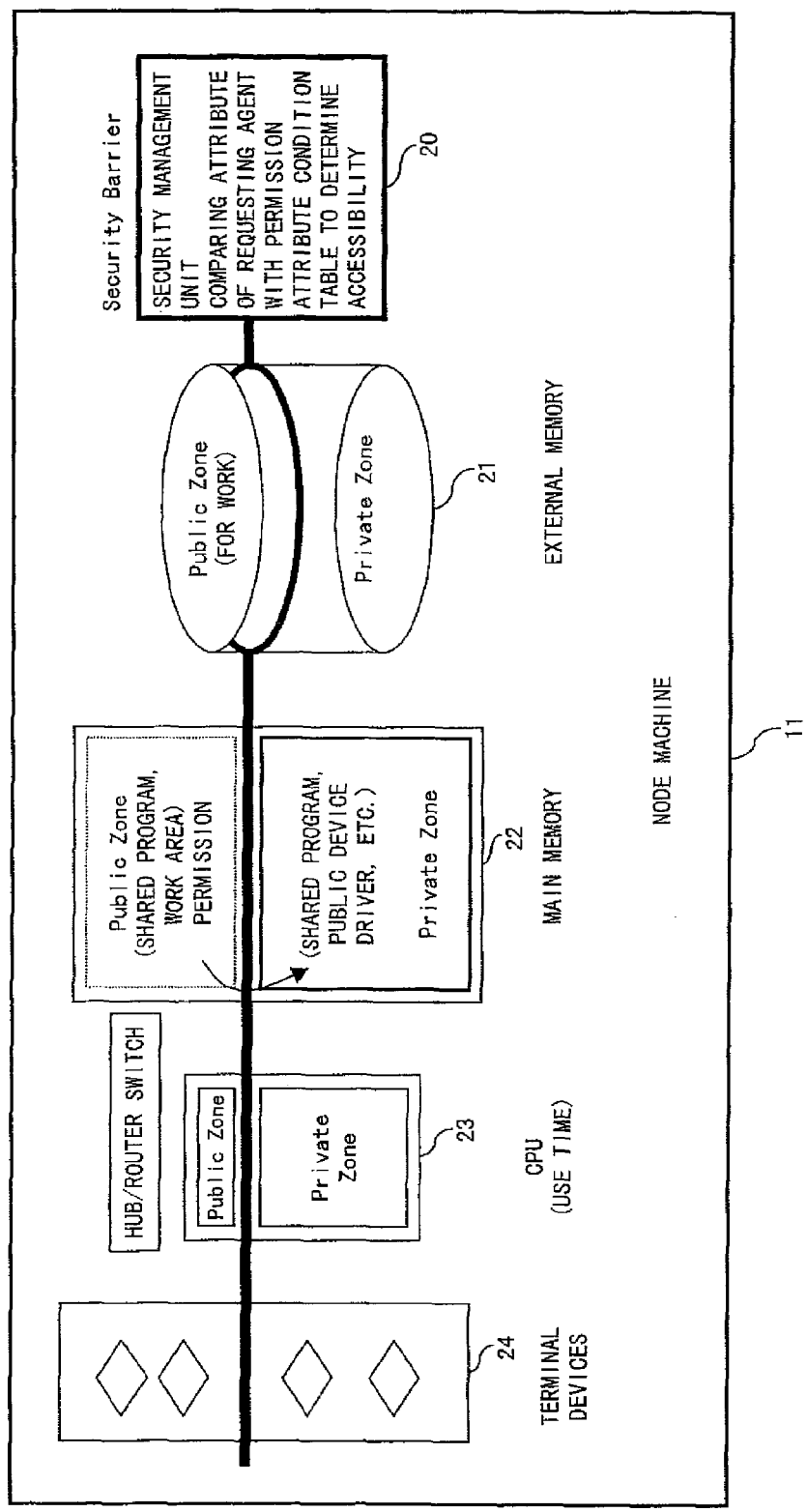
FIG. 10 is an explanatory view of dividing a zone into a public zone and a private zone using a node machine.

The hardware resources (CPU, main memory, auxiliary memory (hardware disk, etc.), router/hub switch, peripheral device, etc.) of each node machine are assigned to a public zone or a private zone. FIG. 10 shows the concept. The assignment of each hardware resource to a public zone or a private zone, and the access management are performed in cooperation with the operating system. For example, the existing systems such as the virtual space management of the OS, the protection of a work area between processes, etc. are extended to the public zone management. By processing the public zone as one system process, the access to the private zone can be rejected.

Each public resource is assigned when the system of the node machine is generated. In the management during the runtime of a node machine, an external access requesting process is treated as a task (hereinafter referred to as an external process), and the access is managed by checking the security attribute of the process when the process accesses resources.

For example, for the CPU, a process scheduler manages the time assigned to the CPU (a predetermined rate of the CPU time is assigned to an external access process). For the main memory, the management is performed by the memory management function of the operating system. In the memory management, a memory area is divided into a public zone area and a private zone area, the security attribute is checked on the access from an external process, and access control is performed on the private zone area. In the case of auxiliary memory, for example, an area is partitioned when a system is generated. During the operation, a security attribute is checked on the access from an external process to the private zone, thereby controlling access to an area. Relating to the peripheral device, etc., it is stated when a system is generated what are presented as public resources are located in a public zone.

Software resources are located in a public zone for a public service for use in routing a message, transferring a message, searching other services, caching an address for the transfer of a message, and caching related information. Especially, the security management unit operates at the boundary between the public zone and the private zone, and all external access is monitored.

A part of the hardware devices of each node machine is presented for a common use as public resources, the publicly presented devices are separate from private resources in the management. Between public resources and private resources, the external access is rejected by a security barrier.

The security barrier is realized by a security management unit 20 described later in detail. The quantity of the hardware resources to be presented as public resources is determined based on the tax or responsibility contract when the owner (or a owner agent) of a node machine joins a community. For example, in FIG. 10, the rate (%) of external memory 21 and main memory 22, the rate (%) of the use time of a CPU 23, and a unit, for example, a printer, etc. in terminal devices 24 are presented as public resources. It is obvious that some of them are not presented as public resources, but in this case, the public resources can be processed as 0% (Null), thereby maintaining the consistency of the system.

A portal agent manages a resource attribute (community attribute), and performs the following operation on the security check process.

The portal agent manages the subscription condition (or contract) of a new subscription agent which joins the community, i.e., provides a permission attribute for accessing to agents within the community with an agent which accepts an contract.

The portal agent manages the agent attribute (in case when the community behaves as an agent) to be shown to the outside of the community.

The portal agent also performs the selection and the management of the functions to be presented as a public service. The functions to be presented as public resources are defined by the subscription contract to the community.

The security management unit (security barrier) of a portal agent operates as follows. The security management unit is located in a node machine to which a portal agent is physically allocated.

Figure 11:
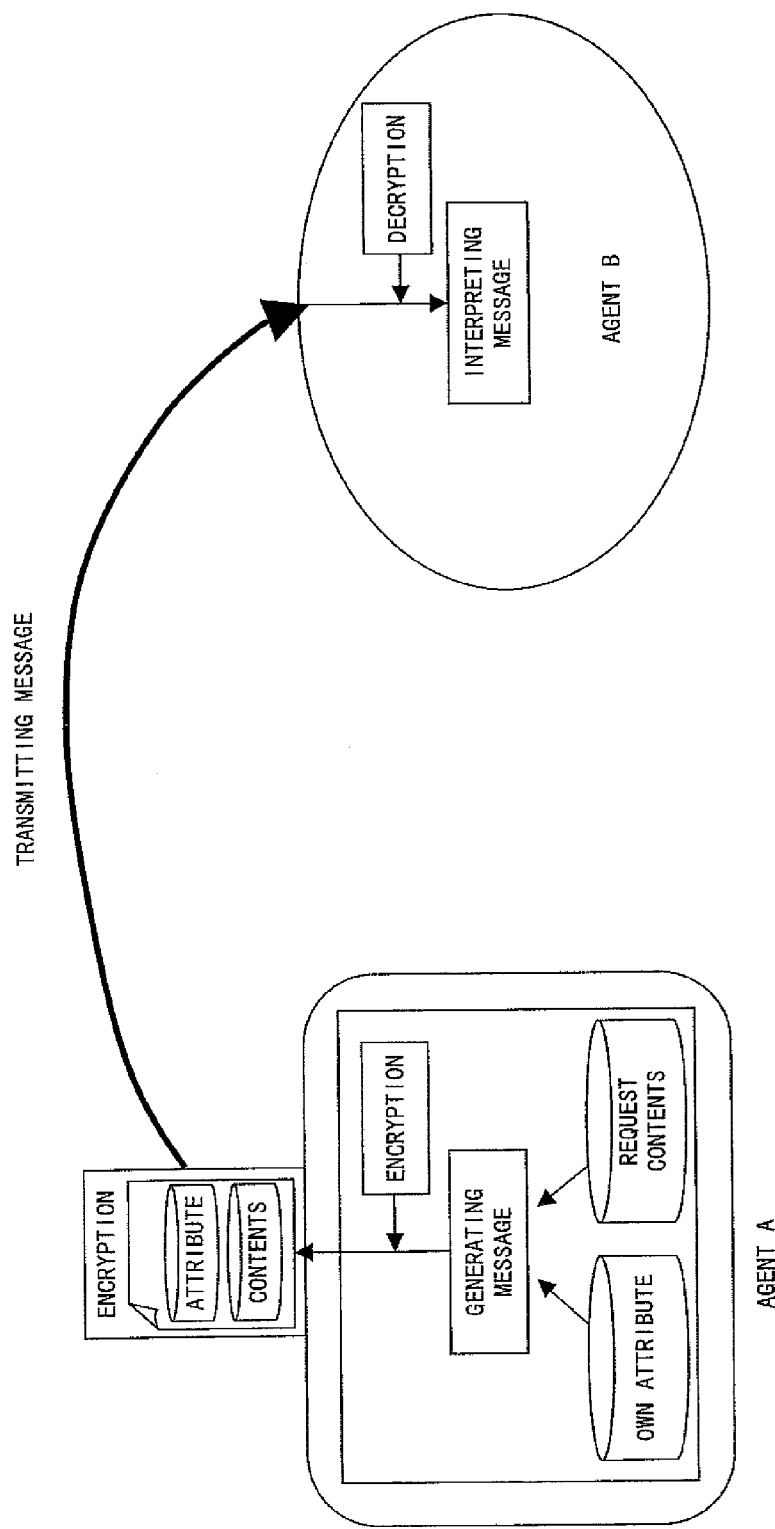
FIG. 11 is an explanatory view of a message generating process and transmitting a message between agents.

A message from an agent of another community is received by a message reception unit. The message is assigned an attribute of the source agent in addition to the contents of the message, and they are all encrypted (FIG. 11).

The message received by the message reception unit is processed in the public zone when the destination is another community, and is transferred to another community. At this time, the public service routines such as routing and transferring a message, searching for another service, address caching for a message transfer, caching related information, etc. are operated.

If the destination of the message is the private resources in the community, then the security management unit in the portal agent interprets the attribute portion of the message, and checks whether or not the attribute of the source satisfies the access permission condition. If it satisfies the condition, then the access to the private resources is permitted (FIGS. 12 to 15)

The access to the private resources can be performed as follows.

Figure 16:
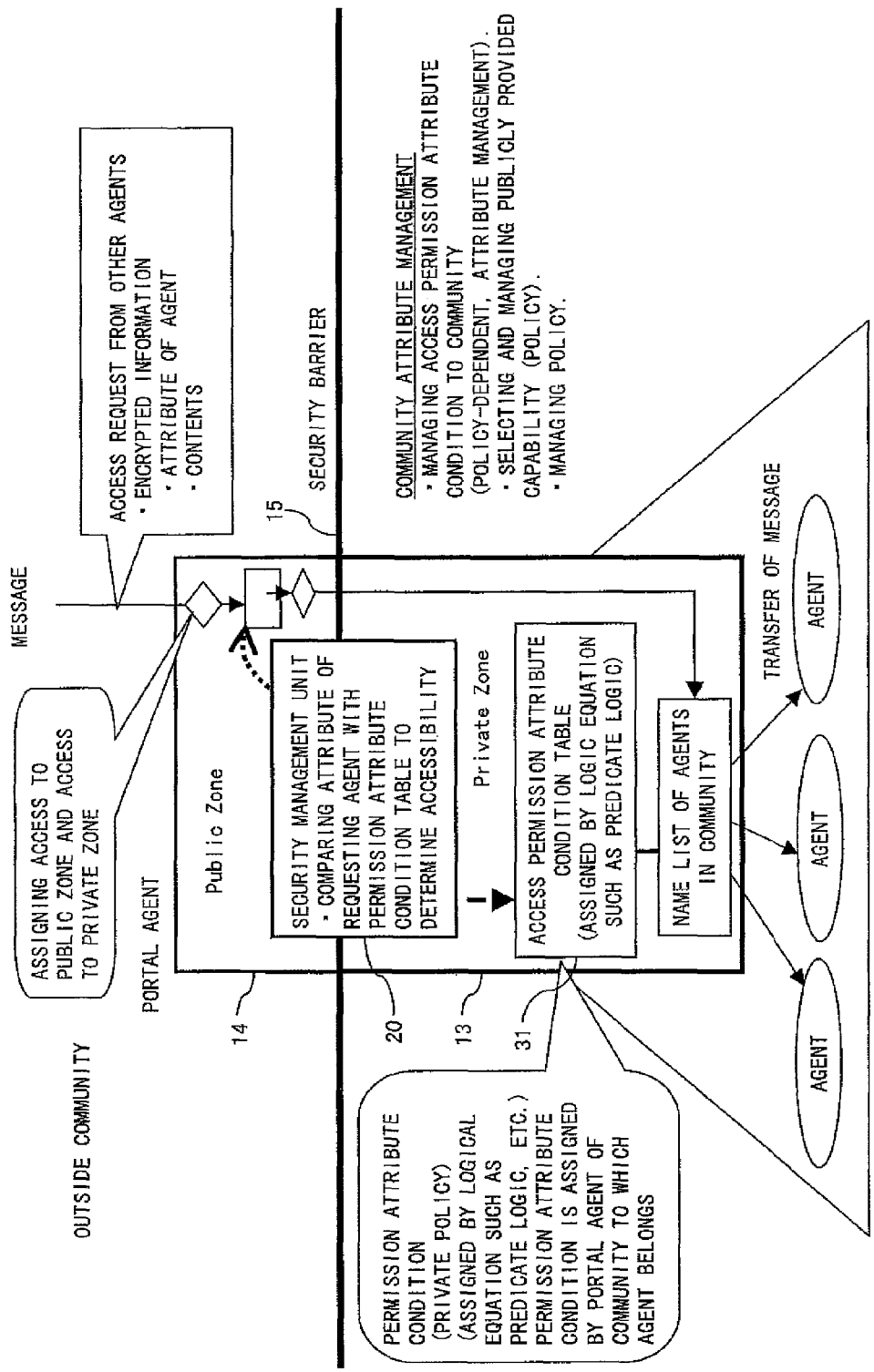
FIG. 16 is an explanatory view of security management by a portal agent.

When the private resources are an agent in a community, a received message is transferred to the corresponding agent (FIG. 16).

When the private resources are the hardware resources or software resources (data, program) in the node, the access to an acceptable access permission attribute in the resources in the private zone is permitted (FIGS. 12 through 15).

FIG. 11 shows the process of generating a message. On the side of transmitting a message (agent A), the attribute of the transmitter is added to the message contents when a message is generated, the contents are encrypted, and the message is transmitted. On the side of receiving the message (agent B), the message is first decrypted and then interpreted. It is assumed that the methods of encrypting, decrypting, and authenticating a message are the latest possible technology.

Figure 12:
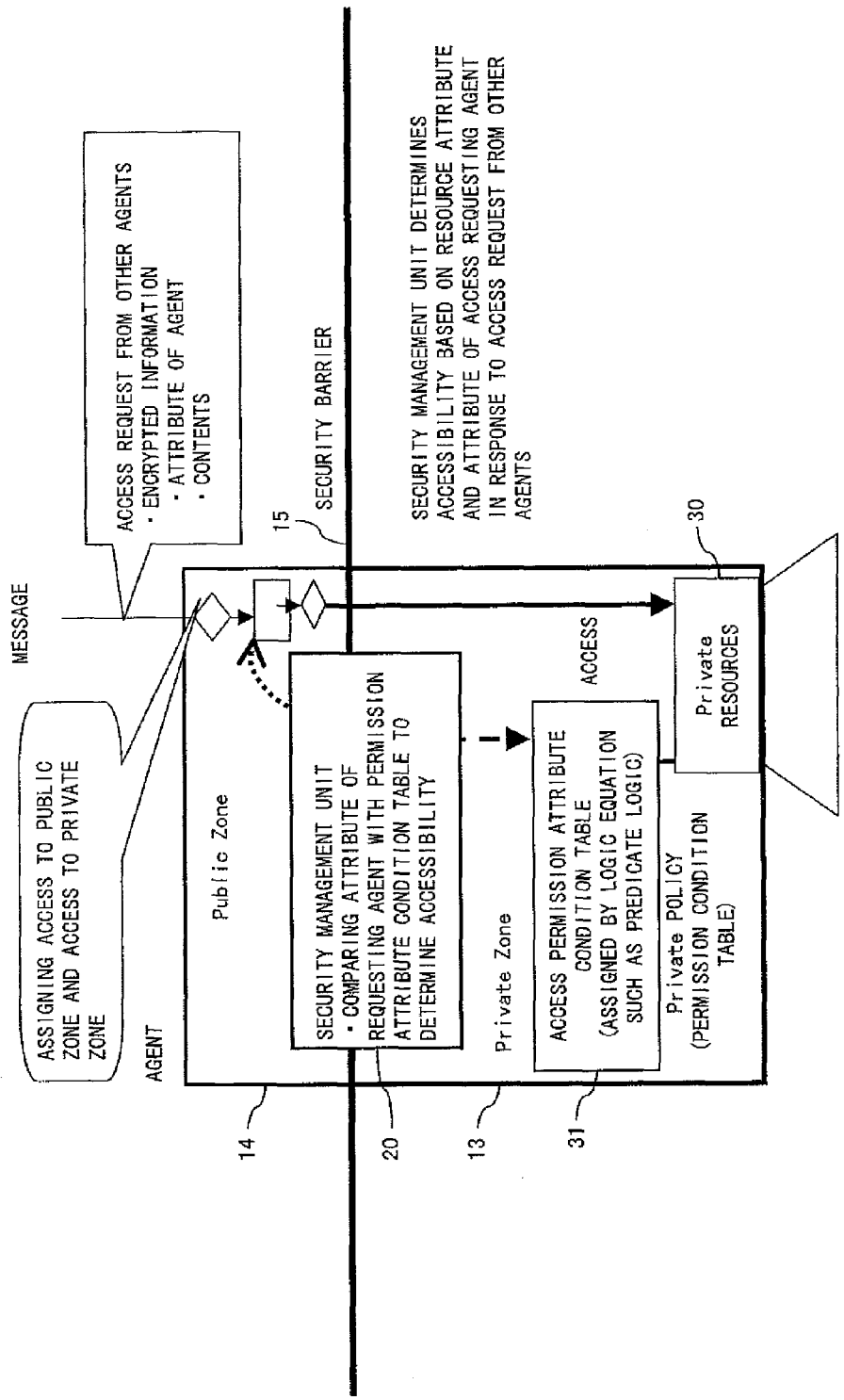
FIG. 12 is an explanatory view of managing the security in accessing private resources.

FIG. 12 shows the common method of the security management in accessing the resources in the community from outside the community.

(1) An access request message from an external agent of the community is checked as to whether it is the access to the public zone 14 or to the private zone 13.
(2) When the public zone 14 is to be accessed, the access is permitted.
(3) Foe an access to or a communication with the private zone 13, the encryption of the message is decrypted, and the attribute of the request agent in the message is extracted.
(4) In the portal agent of the community, an access permission attribute condition table 31 (the private policy to the lower community table of the portal agent) in which the permission condition for the communications with the community is described in the predicate logic is provided, and the attribute of the request agent is checked as to whether or not it satisfies the permission condition.
(5) If it is true as a result of the condition determination, the access to private resources 30 is permitted.

The resources can be a community, hardware resources, and software resources (program and data). Each resource is assigned an access permission attribute condition table as a resource attribute. The permission attribute condition table (private policy) is assigned when the resources are generated.

Figure 13:
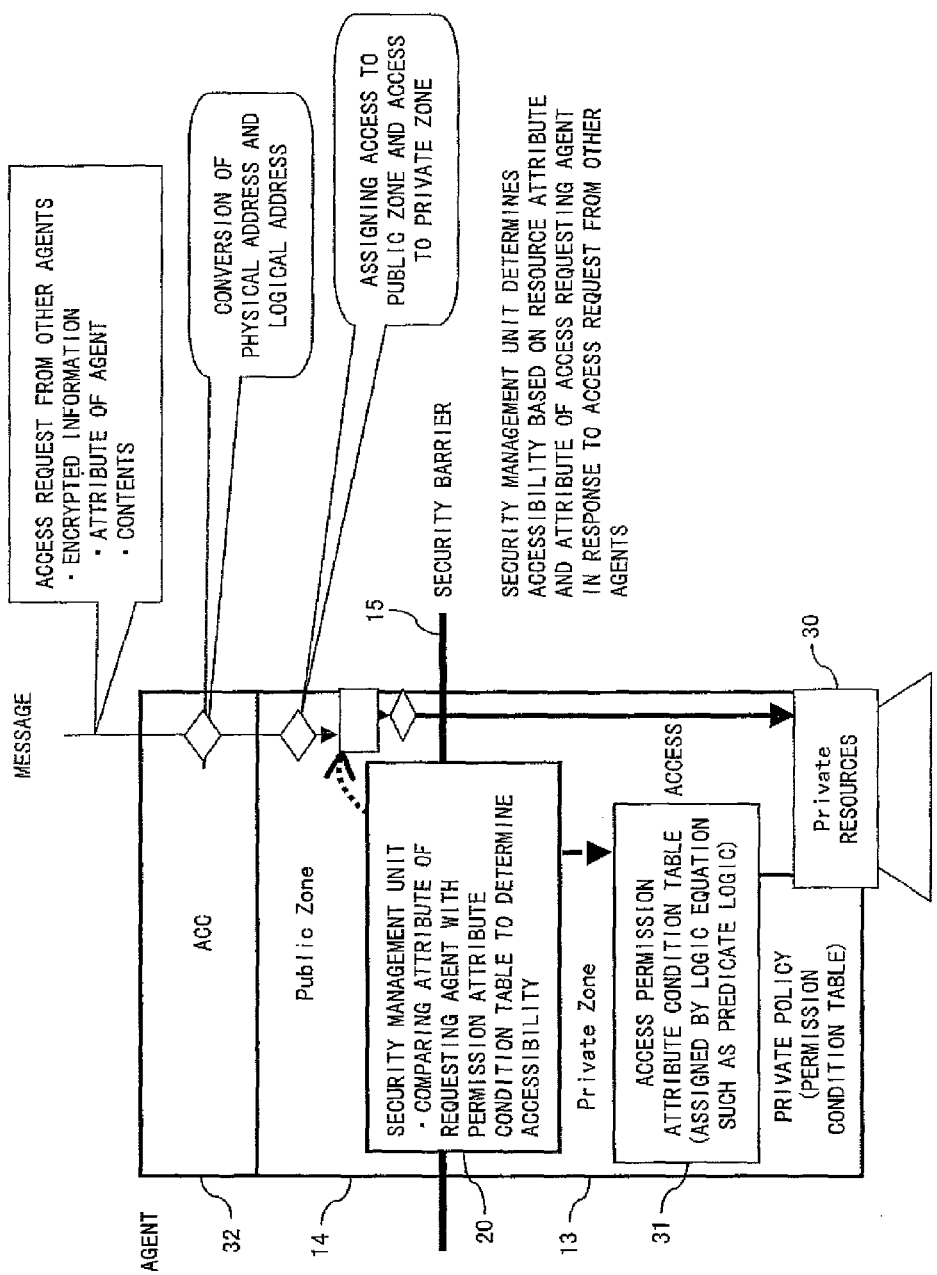
FIG. 13 is an explanatory view of an agent for which an inter-agent communication control zone is added.

FIG. 13 is obtained by adding an inter-agent communication control zone (ACC) 32 to the agent shown in FIG. 12. On the message transmitted from another agent, the ACC 32 performs conversion between a logical address and a physical address, and the message is directed to the public zone or the private zone in the public zone 14.

FIG. 14 shows the configuration of the functions of an agent which manages access. In FIG. 14, generally an agent Y comprises: a message interpretation unit 35 for interpreting a message transmitted from another agent X, and requests an object 36 or 37 for an operation corresponding to the message; a security management unit 20 for monitoring access of the object 37 to the private resources 30; an object which is a program for a public service contained in the public zone 14 and in which either the object 36 or 37 can be realized by, for example, the attribute of the agent X; an agent attribute table 38 holding the attribute unique to the agent; a public resources 39 completely published externally and assigned according to the public policy described later; the private resources 30 used by the user and externally accessible under the control of the security management unit 20; and a private policy 40 as an access rule to the private resources 30 defined by the user or as an access rule pertaining to the private resources 30.

Figure 15:
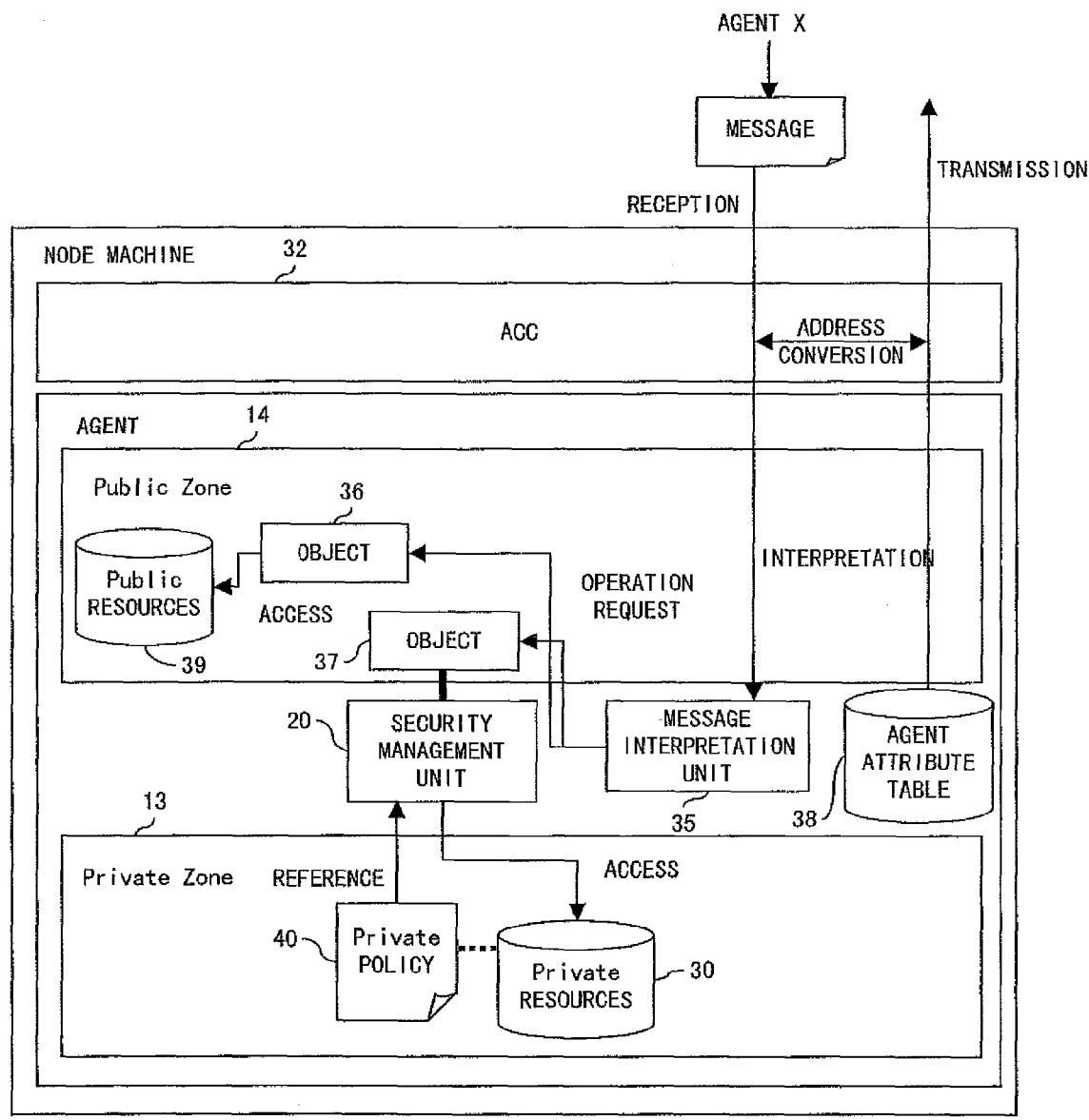
FIG. 15 is a block diagram of the configuration showing the function of the node machine to which an inter-agent communication control zone is added.

FIG. 15 shows the configuration of the node machine obtained by adding the inter-agent communication control zone (ACC) 32 to the agent shown in FIG. 14. As described above, the ACC performs address conversion on a received or transmitted message. Thus, the ACC 32 is set in the node machine so that it can be implemented by software as an interface between the existing physical network communications management unit of the node machine and the agent.

FIG. 16 shows the method of security management on the communications (access) of an agent in a community from outside the community.

(1) An access request message from an external agent of the community is checked as to whether it is the access to the public zone 14 or to the private zone 13.
(2) When the public zone 14 is to be accessed, the access is permitted.
(3) For an access to or a communication with the private zone 13, the encryption of the message is decrypted, and the attribute of the request agent in the message is retrieved.
(4) In the portal agent of the community, a access permission attribute condition table 31 in which the permission condition for the communications with the community is described in the predicate logic is provided, and the attribute of the request agent is checked as to whether or not it satisfies the permission condition.
(5) If it is true as a result of the condition determination, the message is transmitted in the community.

The communications permission condition to the agent in the community is assigned as an access permission attribute condition table to the lower community table of the portal agent. The access permission attribute condition table is assigned when the community is generated.

Figure 17:
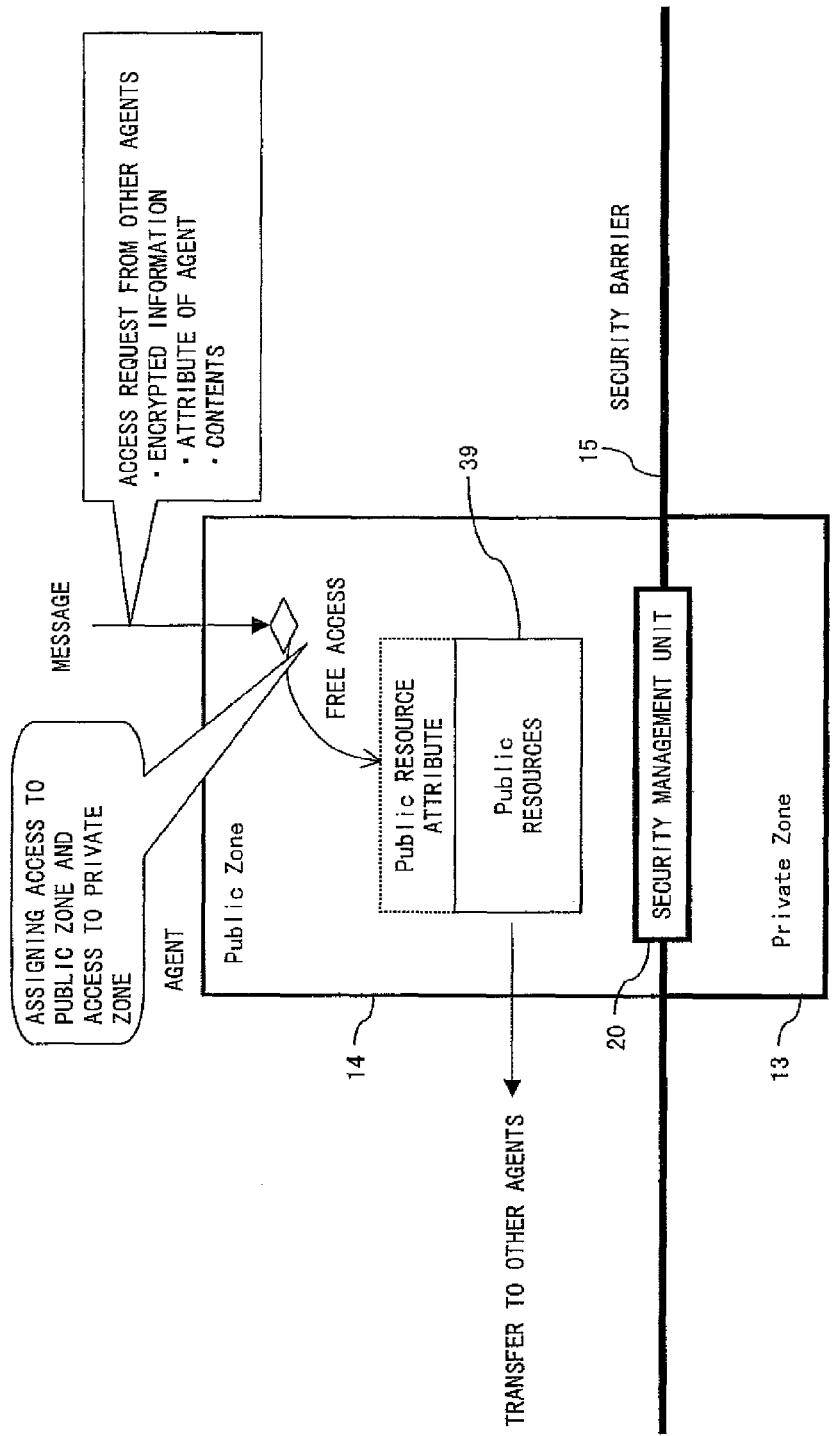
FIG. 17 is an explanatory view of managing access to public resources.

The access management to the public resources is performed as shown in FIG. 17.

(1) An access request message from an external agent of the community is checked as to whether it is the access to the public zone 14 or to the private zone 13.
(2) When the public zone 14 is to be accessed, the access is permitted.
(3) When the destination of the transfer of the message is another agent external to the community, the message is transferred to the agent.

Then, the relationship between the community when the agent joins the community and the public policy is explained below as the third embodiment. It is necessary for an agent to join a community, any qualification (attribute) is required. After it joins the community, it has to present any contribution (offer a service) to the community. The framework is realized by the system of an attribute and a public policy.

A public policy is represented by the description of a service rule to be presented by an agent when it joins a community, For example, it is presented in, for example, a predicate logic format.

The operation of an agent when it joins a community is described below.

(1) An agent presents its own agent attribute and a part of the attribute of the node (machine environment in which the agent operates) to the portal agent of the community.

(2) The portal agent compares the community subscription condition with the attribute of the agent requesting to join a community, and determines the possibility of the agent joining to the community.

(3) The portal agent transmits a public policy to the agent requesting to join a community. The agent who requests to join the community receives the public policy, and returns a message indicating that an appropriate service is to be presented to the community (subscription contract established). Furthermore, the portal agent updates the name list of the agent managed by the portal agent.

A public policy is formed by a correspondence rule (predicate logic system, etc.) between an agent attribute and a service group to be presented by the agent in the community. When the agent receives the public policy, the agent has to provide the service in the public zone of the node (hardware resources) to which the agent belongs.

Figure 18:
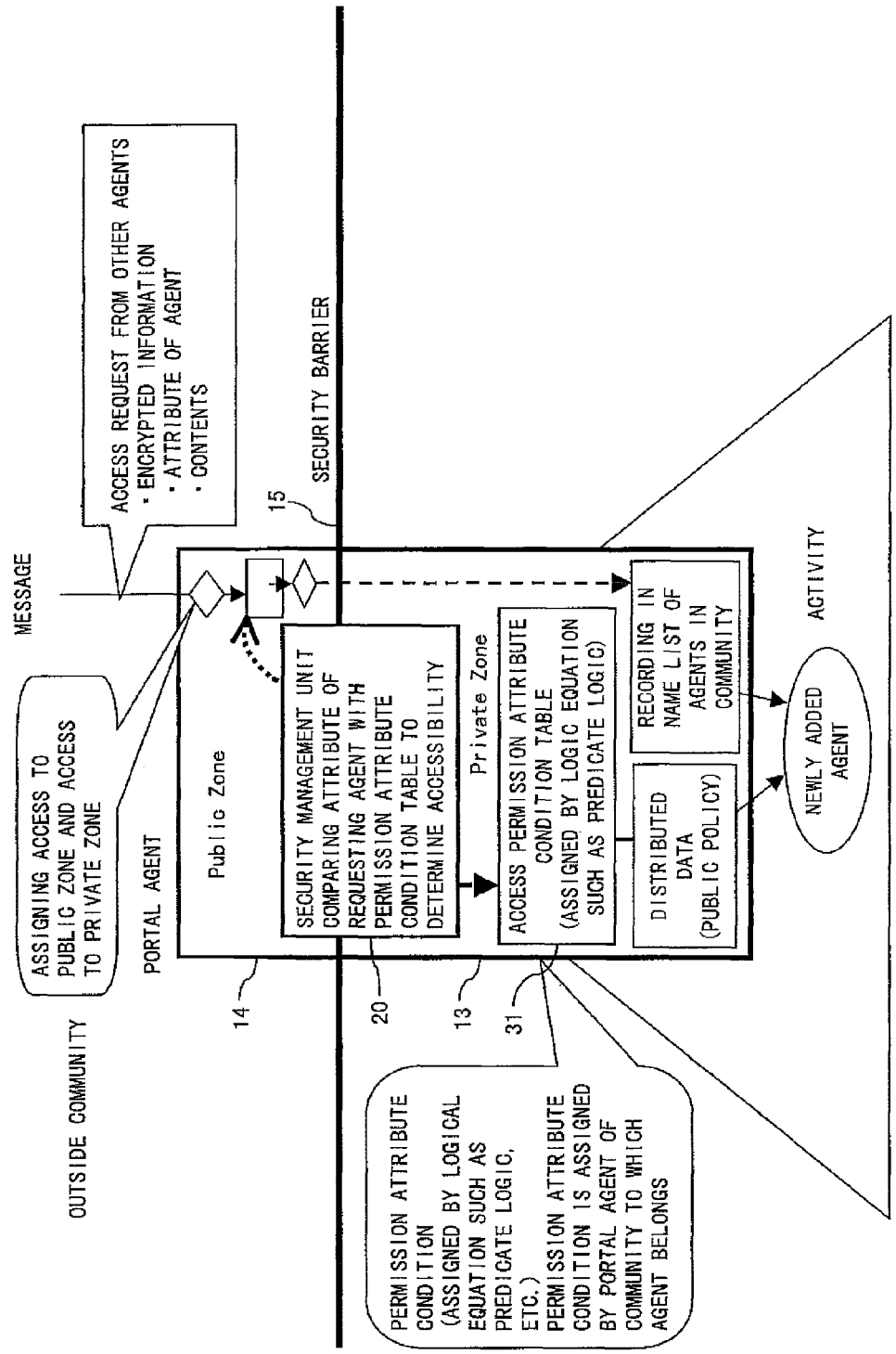
FIG. 18 is an explanatory view of examining the possibility of the subscription to a community.

FIG. 18 is an explanatory view of the examination of the subscription qualification when an agent joins a community. When a portal agent receives a subscription request message from an external agent, the message is decrypted, (the subscription request message is assumed to be the communications to a private zone) and processed by the security management unit 20. In the access permission attribute condition table 31 of the security management unit 20, the access permission condition for the public policy (the attribute of the subscription requesting agent and subscription contract responsibility items) is described, and it is checked whether or not the condition is satisfied. If the condition is satisfied, negotiations (communications of messages) are made with the subscription requesting agent as to whether or not the responsibility of presenting resources as the subscription contract. In the negotiations, a contract confirmation message describing the presented resources items and its amount (such as providing rates of hardware resources (memory, CPU, etc.)) is transmitted to the subscription requesting agent. After obtaining the response, the contract is established. If the subscription attribute condition and the subscription contract are satisfied, the agent is permitted to act as an agent in the community (arranging the operation environment of the agent).

Figure 19:
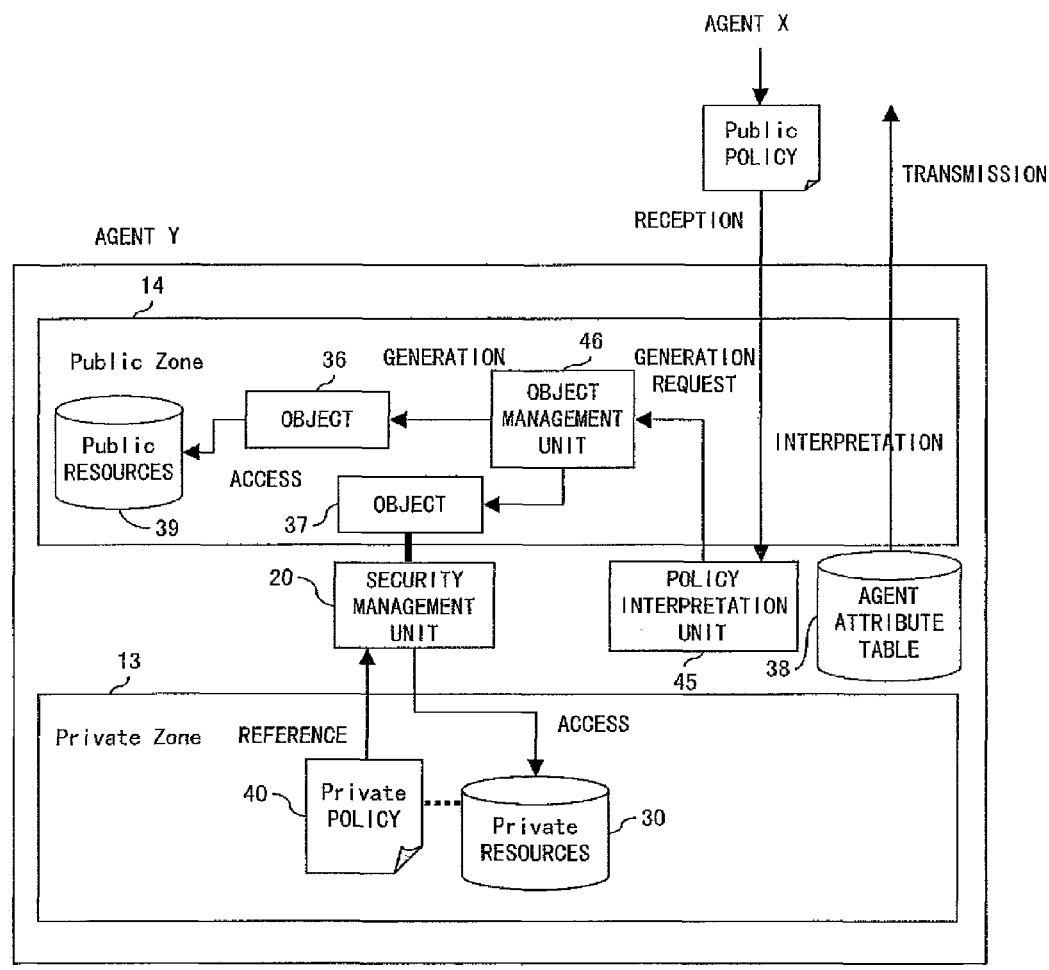
FIG. 19 is a block diagram of the configuration showing the function of the agent corresponding to the examination of the eligibility for the subscription to a community.

FIG. 19 shows the configuration of the function of the agent corresponding to the examination of the community subscription qualification. As compared with FIG. 14, the message interpretation unit 35 is replaced with a to policy interpretation unit 45 for referring to the public policy assigned as a subscription contract condition and the agent attribute table 38 and determining the object 36 to be allocated for access to the public resources 39, and an object management unit 46 for managing the generation and deletion of an object.

Described below are more practical situation and examples of the operations.

(1) For example, assume that there is a community "research community A".

(2) To join the research community A, an agent has to hold the attribute "ACM#Member" or "IEEE#Member". The public policy of the research community A describes the subscription condition (contract) that an agent having the attribute ACM#Member provides a freely available service of a disk of 100 MB, and an agent having the attribute IEEE#Member provides a freely available service of a disk of 500 MB".

(3) Assume that three agents X, Y, and Z are to join the research community A, and that the agent X has the attribute ACM#Member, the agent Y has the attribute IEEE#Member, and the agent Z has the attribute AAAI#Member. In this situation, the agents X and Y can join the research community A, but the agent Z cannot.

(4) According to the public policy issued by the portal agent of the research community A, the agents X and Y have to provide the disk space of 100 MB and 500 MB respectively in the community.

Figure 20:
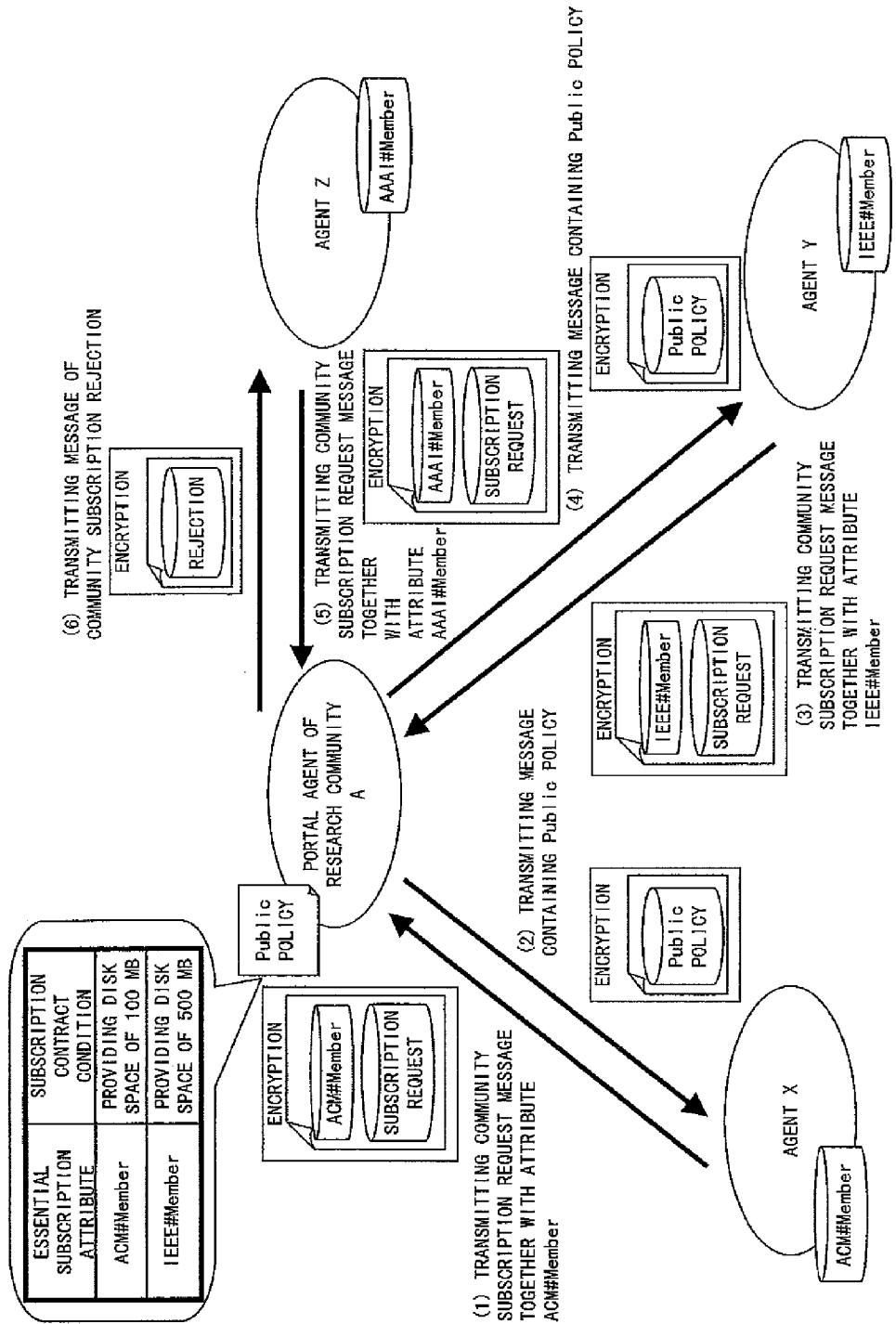
FIG. 20 is an explanatory view of the examination of the eligibility for the subscription to a community for the three agents X, Y, and Z.

The internal operation of the agent X is explained below by referring to FIG. 20.

(1) The agent X transmits the attribute ACM#Member which is a part of the node attribute, and obtains the public policy from the portal agent of the research community A.

(2) The policy interpretation unit 45 shown in FIG. 19 analyzes the public policy received from the portal agent research community A, derives the object "providing the disk space of 100 MB", and notifies the object management unit 46 of the object. The object management unit 46 generates the object 36. At this time, the object performs reading and writing operations on the file (or directory of 100 MB).

The examination of the community subscription qualification of the agents Y and z is given below by referring to FIG. 20. In (3), the community subscription request message is transmitted to the portal agent of the research community A together with the attribute IBEE#Member from the agent Y in (3), and the attribute AAAI#Member from the agent Z in (5). From the portal agent to the agent Y, the message containing the public policy is transmitted in (4). A community subscription rejection message is transmitted to the agent Z in (6).

Finally, the control of the access from an agent in another community to the private resources is described below as the fourth embodiment. When a plurality of agents (nodes) communicate with one another, information is communicated through a public object operating in each public zone. Normally, a public object can access the public resources only by the access control of the public execution environment, and cannot access the private resources in the private zone. However, depending on the attribute of an agent, the private resources of the communication partner agent can be accessed. This system is realized by comparing the private policy with the agent attribute of the communication partner. A private policy is a rule described in a predicate logic, etc. in which an agent attribute corresponds to the accessibility to the resources. The private policy can be defined by the user, or can be added to the resources themselves. Described below is the operation procedure of the system.

In this example, the private (and public) resources (memory area, data, program, etc.) are assumed to be an object, and an accessing operation to the object and the access permission condition of the resources (resources attribute) are assigned to the object (for example, a document, a movie, music, etc. are good examples.)

The operation of a data object is realized by a reading or a writing operation, and the operation of a program is realized by execution. Accessing the resource object refers to the execution of an operation routine. The operation routine is located in the public zone. When resources are public, the resources are located in the public zone, and the operation routine can be freely activated. The operation routine corresponds to that of the object 36 shown in FIG. 14.

When the resources are private, the resources are located in the private zone, and the security management is performed on the access to the resources in the private zone. That is, when the operation routine is activated, the security attribute is also checked.

The explanation is given below by referring to an example.
(1) The agent X requests the agent Y for information I. At this time, the agent X presents a part of its attribute to the agent Y.
(2) The agent Y generates an object in the public zone of the agent Y to operate the information I. At this time, the attribute of the object is set as the attribute of the agent X. The object corresponds to the object 37 shown in FIG. 14, and the operation is performed under the monitor of the security management unit 20.
(3) The object 37 requests the security management unit 20 for the operation on the information I.
(4) The security management unit 20 compares the attributes of the object with the private policy 40, and determines the accessibility of the object 37.
(5) If it is accessible, Y returns a response to X about the information I, and rejects if access is not permitted.

Figure 21:
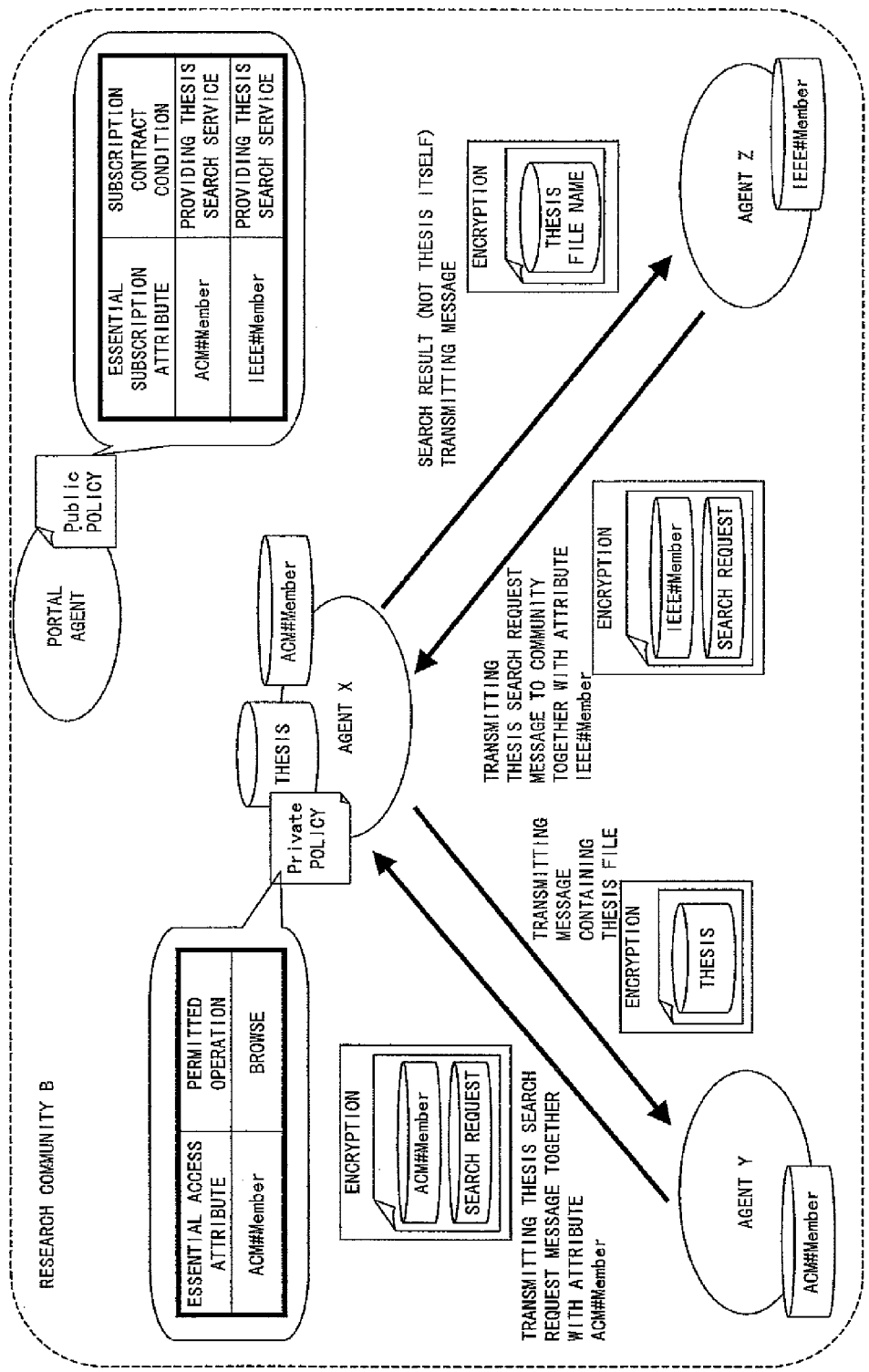
FIG. 21 is an explanatory view of managing access to the data in the private zone in the inter-agent communications.

A practical example is described below by referring to FIG. 21.

The research community B contains the agents X and Y having the attribute ACM#Member and the agent Z having the attribute IEEE#Member, and the public policy describes a file search service for the X, Y, and Z. Additionally, it is assumed that X holds a thesis file to which a private policy "only an agent having the attribute ACM#Member can browse" is added to its own private zone.

In the situation, Y can search and download a thesis file from X. On the other hand, Z can search a thesis file from X, but cannot download and browse it. The internal operations of X are described below.
(1) The agent X sets the attribute of the object corresponding to the thesis file search (searching and reading operations on the thesis file) to the attribute ACM#Member.
(2) The file search object requests the security management unit for a filing operation. The file search object corresponds to the object 37 shown in FIG. 14.
(3) The security management unit 20 checks whether or not the request of the file search object matches the private policy 40 of the thesis file.
(4) In this case, access is permitted, and the file search object can access the thesis file in the private resources 30, and completes the file operation on the thesis file.

(The agent Z fails in the access. That is, a file searching operation and a file browsing operation are defined in the file search object, and the file browsing operation in response to the request from the agent z is prohibited by the security management unit.)

Not only in the global information distribution service industry, the present invention can also be applicable in the production industry of hardware relating to the software for guaranteeing access security in the private zone by allocating the calculation resources and information resources into a public zone and a private zone.

What is claimed is:

1. A network system in which a network node machine performs intercommunication, the network node machine comprising:
    a plurality of agents operable in parallel and hardware resources and software resources being managed by an agent corresponding to each resource, and the network system being built as a logical hierarchical structure by realizing communication units of the agents, wherein the network system being built as the logical hierarchical structure is a hierarchical agent community having a directed acyclic graph structure, and wherein each of the agents comprises:
    a first storage unit storing, as a lower community, a group of agents comprising a group of agents to which access is not limited and a group of agents to which access is limited,
    a second storage unit storing an access permission/rejection determination policy for an agent to which access is limited; and
    a security management unit determining, when an access request is issued by another agent, whether a message is to be transferred to an agent to which access is limited by referring to the first storage unit, and performing, when an access request is issued to an agent to which access is limited, access permission/rejection control to an agent to be accessed, referring to the second storage unit, and checking whether or not an access condition is satisfied depending on whether or not a condition indicated by a logic equation of a predicate logic in Symbolic Logic is satisfied wherein,
    an access request issued by another agent comprises attribute information including attribute of the another node and given in a predicate logic, and
    the security management unit checks whether or not the attribute information satisfies an access condition to the agent to be accessed by investigating whether or not a condition indicated by a logic equation of a predicate logic is satisfied,
    wherein the security management unit performs, when receiving a subscription request information to the community transmitted from another agent including policy information, permission/rejection of the community, and adds an agent of which subscription to the community is permitted as an agent within the community in the first storage unit.

2. The network system according to claim 1, wherein the security management unit accesses the agent to be accessed without referring to the second storage unit, when the request is determined as not for an agent to which access is limited, in determining whether the request is for an agent of which access is limited.

3. The network system according to claim 2, wherein
    the access permission/rejection determination policy stored in the second storage unit is an association of the attribute information in the predicate logic and an access permission/rejection condition given in the predicate logic, and
    the security management unit makes a determination on the basis of the attribute information in the access request and attribute information of the access permission/rejection determination policy stored in the second storage unit, and performs access permission/rejection control of the agent to be accessed.

4. A network node machine performing intercommunication, comprising:
    a plurality of agents operable in parallel, and hardware resources and software resources being managed by an agent corresponding to each resource, and the network system being built as a logical hierarchical structure by realizing communication in units of the agents, wherein the network system being built as the logical hierarchical structure is a hierarchical agent community having a directed acyclic graph structure, and wherein each of the agents comprises:

a first storage unit storing, as a lower community, a group of agents comprising a group of agents to which access is not limited and a group of agents to which access is limited;

a second storage unit storing an access permission/rejection determination policy for an agent to which access is limited; and a security management unit determining, when an access request is issued by another agent, whether a message is to be transferred to an agent to which access is limited by referring to the first storage unit, and performing, when an access request is issued to an agent to which access is limited, access permission/rejection control to an agent to be accessed, referring to the second storage unit, wherein, an access request issued by another agent comprises attribute information including attribute of the another node an given in a predicate logic, and the security management unit checks whether or not the attribute information satisfies an access condition to the agent to be accessed by investigating whether or not a condition indicated by a logic equation of a predicate logic is satisfied, and performs, when receiving a subscription request information to the community transmitted from another agent including policy information, permission/rejection of the community, and adds an agent of which subscription to the community is permitted as an agent within the community in the first storage unit.

* * * * *